United States Patent [19]

Henderson et al.

[11] 4,003,832

[45] Jan. 18, 1977

[54] METHOD OF APPLYING OZONE AND SONIC ENERGY TO STERILIZE AND OXIDIZE WASTE WATER

[75] Inventors: Angus D. Henderson, Bayside; John M. Periale, Central Islip, both of N.Y.

[73] Assignee: TII Corporation, Lindenhurst, N.Y.

[22] Filed: Nov. 24, 1975

[21] Appl. No.: 634,874

Related U.S. Application Data

[63] Continuation of Ser. No. 431,012, Jan. 7, 1974, abandoned.

[52] U.S. Cl. .................... 210/19; 210/50; 210/63 Z; 210/64; 210/DIG. 22; 21/54 A; 21/58; 21/102 A; 204/176; 261/122; 261/DIG. 42; 261/DIG. 48

[51] Int. Cl.² ............... C02B 3/08; C02C 5/06

[58] Field of Search ............ 210/8, 15, 42, 50, 53, 210/63 Z, 64, 199, 259, 294, DIG. 22; 21/54 A, 54 R, 58, 102 A; 204/176; 261/DIG. 42, DIG. 48, 122

[56] References Cited

UNITED STATES PATENTS

| | | | |
|---|---|---|---|
| 1,865,433 | 7/1932 | Daily | 210/63 Z |
| 2,417,722 | 3/1947 | Wolff | 210/19 |
| 3,264,213 | 8/1966 | Pav | 261/DIG. 48 |
| 3,458,140 | 7/1969 | Schryver | 210/64 |
| 3,672,823 | 6/1972 | Boucher | 21/54 A |
| 3,686,115 | 8/1972 | Farmen | 210/19 |
| 3,772,188 | 11/1973 | Edwards | 210/15 |
| 3,807,563 | 4/1974 | Reid | 210/139 |
| 3,886,064 | 5/1975 | Kosonen | 210/522 |
| 3,886,064 | 5/1975 | Boucher | 21/54 R |

OTHER PUBLICATIONS

Water Pollution Control Research Series, Feasibility Studies of Applications of Catalytic Oxidation in Waste Water, U.S. Environmental Protection Agency, Nov. 1971, Project No. 17020ECI, Contract No. 14-1-2-572, Author – Southern Illinois University, pp. 25–31.

*Primary Examiner*—Charles N. Hart
*Assistant Examiner*—Ernest G. Therkorn
*Attorney, Agent, or Firm*—Oldham & Oldham Co.

[57] ABSTRACT

A tertiary waste water treatment system wherein the waste water is subjected to physical chemical processes. The waste water is treated with a coagulating agent, a polyelectrolyte and then is clarified in a lamina preferably of unique design. The clarified waste water is then filtered and passed through an ozonation-sonication chamber wherein the liquid flows counter to the ozone. Within the tower, the liquid is subjected to substantial levels of sonication, enough to cause cavitation, either simultaneously with or prior to encountering large concentrations of ozone. After the ozonation-sonication treatment, the effluent may be discharged or it may be passed through an ozone contact chamber.

6 Claims, 20 Drawing Figures

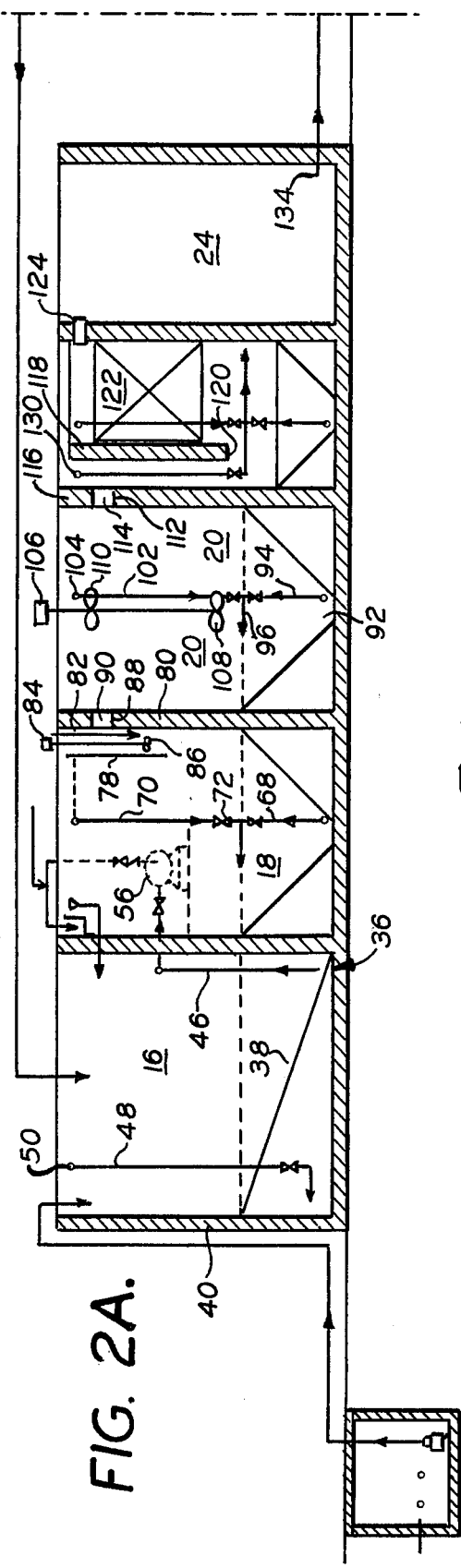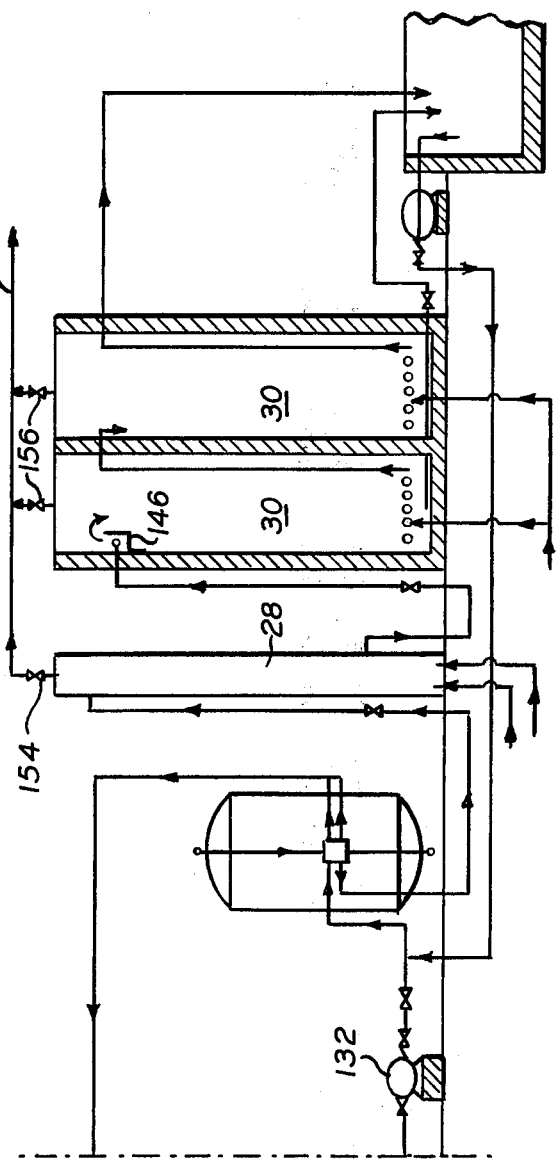

FLUID VELOCITY UPWARD

FLUID VELOCITY UP INTO SETTLER

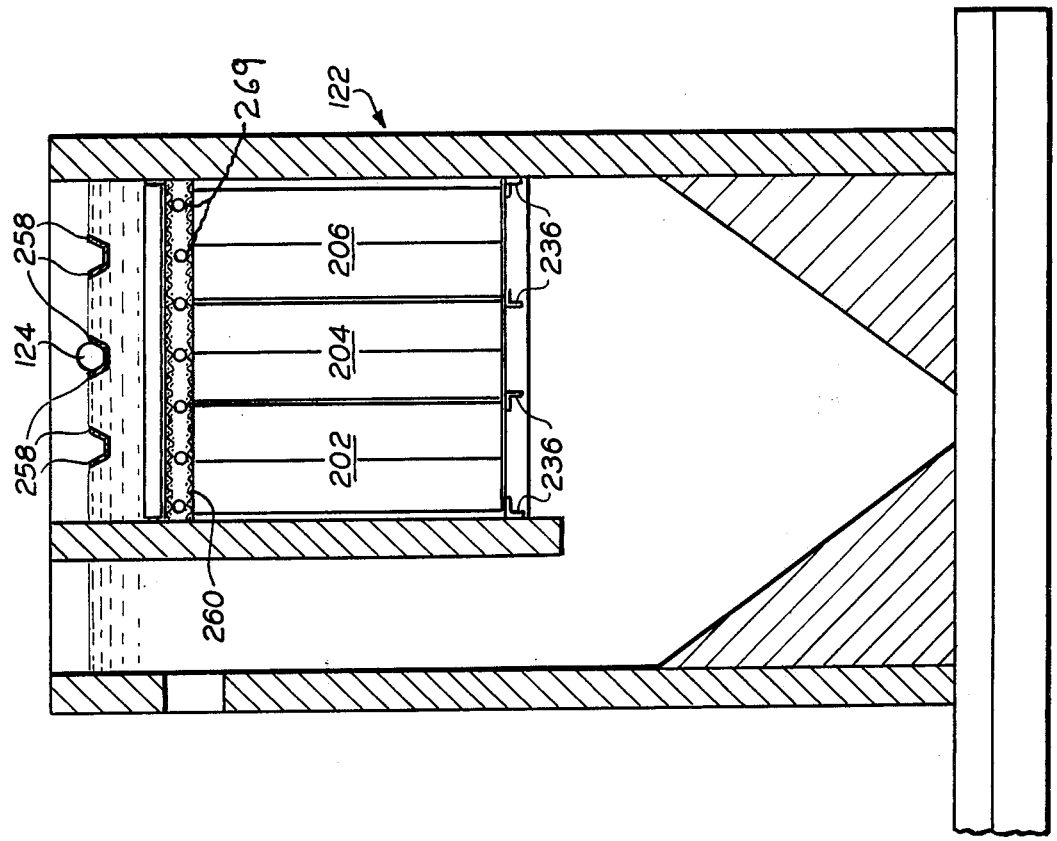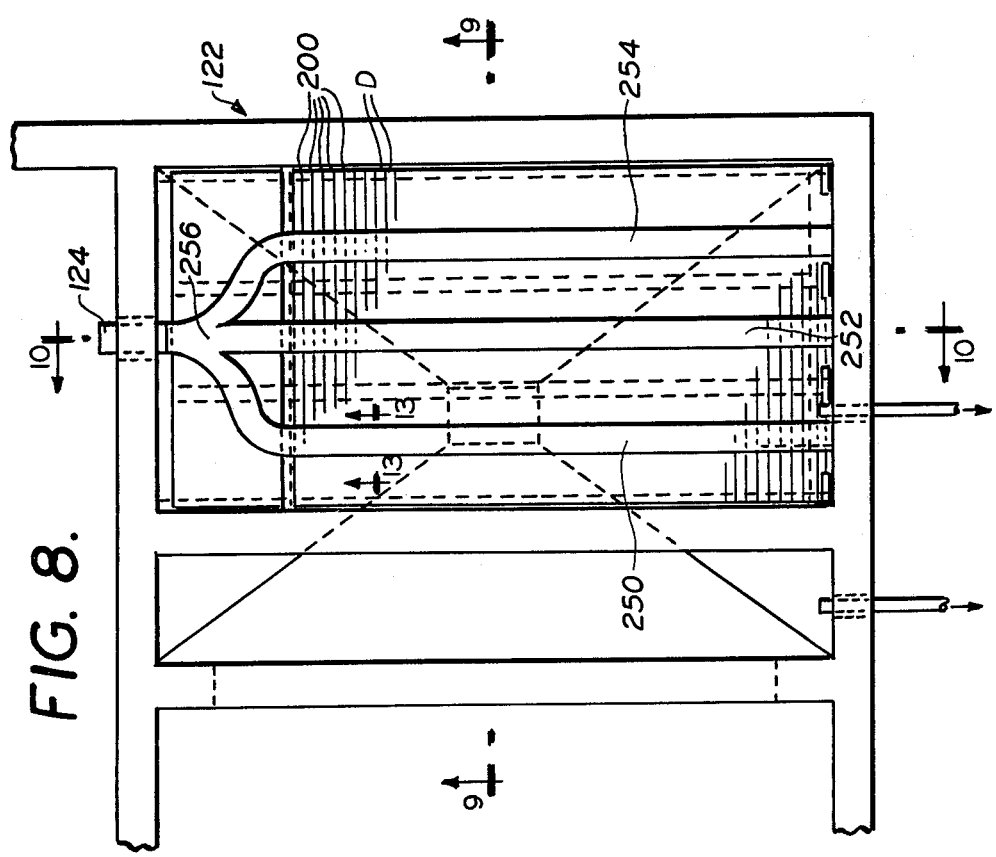

METHOD OF APPLYING OZONE AND SONIC ENERGY TO STERILIZE AND OXIDIZE WASTE WATER

This is a continuation of application Ser. No. 431,012, filed Jan. 7, 1974, now abandoned.

BACKGROUND OF THE INVENTION

1. Field of the Invention

This invention relates to waste water treatment and particularly to a waste water treatment system capable of meeting the standards commonly attributed to what is called tertiary waste water treatments.

2. The Prior Art

In co-pending U.S. patent application Ser. No. 136,404 filed by David Bybel et al. for WASTE TREATMENT PROCESS AND APPARATUS, which application is assigned to the assignee hereof, there is described and claimed a novel treatment of waste water including the steps of sonication and ozonation of the waste water being treated. The invention so described by Bybel et al. has provided a point of departure for the inventors of the present invention who have invented a novel waste water treatment system and plant incorporating the ozone-sonics concept of Bybel et al., which plan optimizes the effect of such ozone-sonics treatment in combination with other physical-chemical treatment. In addition, the present invention relates to treating waste water with ozone and sonics which is improved in effectiveness over that described and claimed by Bybel et al.

SUMMARY OF THE INVENTION

This invention is directed to a novel method of treating waste water preferably wholly by physical-chemical means. As the waste water enters the plant, it is subjected to comminution or screening as by a grit chamber or the like, or both, and is then passed to an equalization tank which serves as a reservoir to maintain substantially constant flow through the rest of the plant. The waste water then flows to a settling tank and as it leaves the settling tank a coagulating agent such as ferric chloride is added. The waste water then goes into a flocculation tank where a polyelectrolyte is added and the floc thereby formed mainly falls to the bottom for sludge removal. The partially clarified waste water then is passed through a lamina, preferably a unique design, and then to a filter. The clarified and filtered waste water is then passed to a unique ozonation-sonication chamber where it is subjected to ultrasonic vibrations at cavitation levels either in advance of or simultaneously with ozonation. In the preferred form, the ozonation-sonication tower is sectionalized so that the clarified waste water is subjected to two different frequencies of sonic energy. After treatment in the ozonation-sonication tower, the effluent may be discharged, or it may be passed to ozone contact tanks for further ozonation.

BRIEF DESCRIPTION OF THE DRAWINGS

FIGS. 2A and 2B, when placed alongside of one another with FIG. 2B on the right, make up a hydraulic flow diagram of the plant of FIG. 1;

FIG. 8 is a top plan view in enlarged scale of the lamina employed in the plant of FIG. 1;

FIG. 9 is a sectional view taken along line 9—9 of FIG. 8;

DETAILED DESCRIPTION OF THE PREFERRED EMBODIMENT

Figure 1:
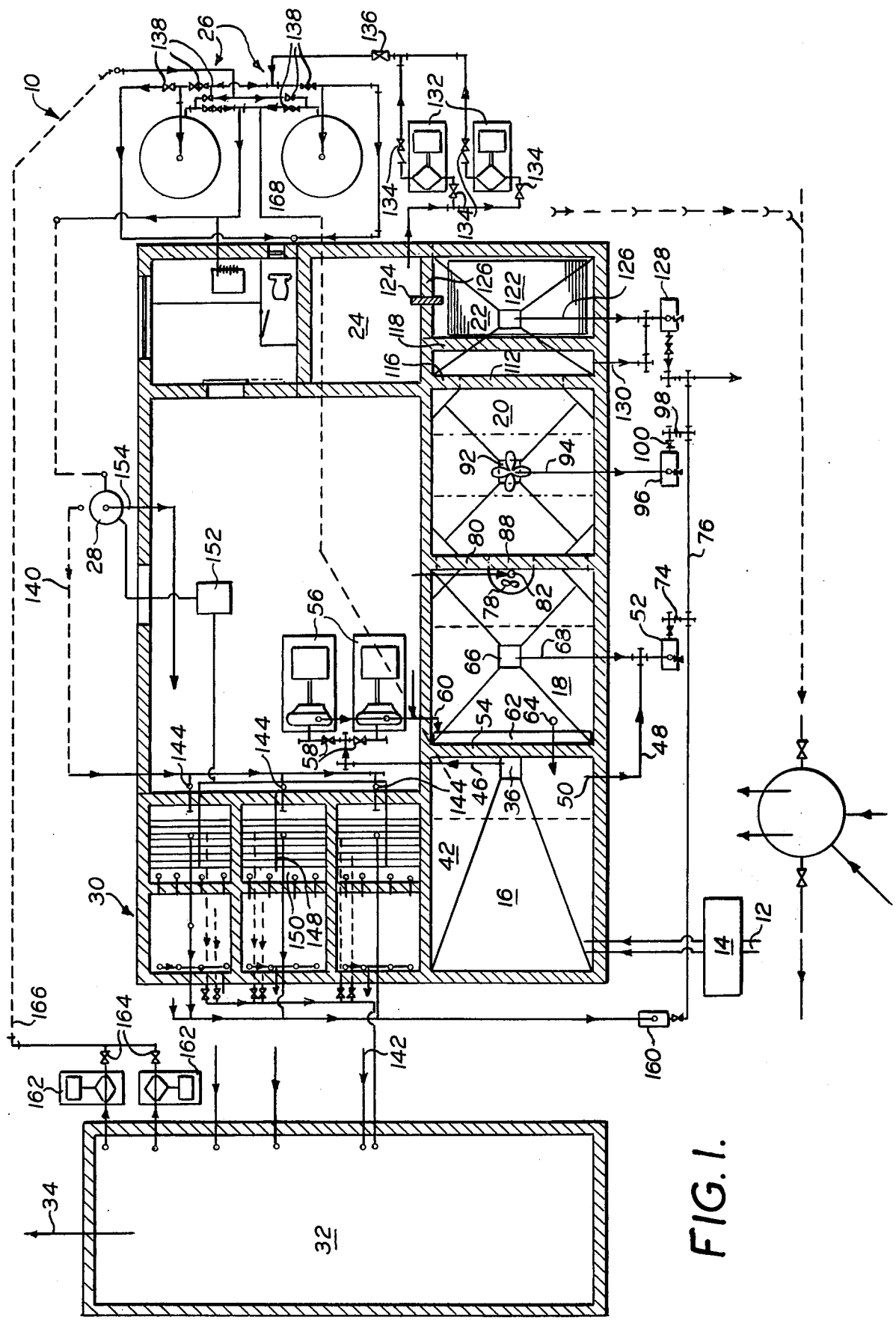
FIG. 1 is a top plan view, partly schematic, of a waste water treatment plant embodying the present invention.

Referring now to the drawings in detail, the waste water treatment plant for performing the method of the present invention is generally designated by the reference numeral 10. Such plant 10 includes an influent sewer line 12 having a comminutor 14 interposed therein, an equalization tank 16, a settling tank 18, a flocculaion tank 20, a clarification tank 22, a sump 24, filtering means 26, an ozonation-sonication column 28, ozone contact tanks 30, a holding basin 32 and an effluent sewer line 34. As will be seen hereinafter, the waste water moves progressively through the plant in the sequence described.

The influent sewer line 12 may have interposed within it any suitable form of comminutor 14 such as a macerator or any other device for breaking up large particles entrained in the influent into smaller particles more suspectible of treatment. In addition, although not shown, influent sewer line 12 may also include necessary pumps for pumping the influent into the waste treatment plant. The form of comminutor employed herein forms no part of the present invention and any of a large number of well-known comminutors may be employed for this purpose. Alternative to the comminutor, grit chambers and/or influent screens of well-known type may be employed to remove large particulate material from the waste water to thereby insure the entrained and dissolved solids in the waste water to be of suitable particle size for treatment by the system. These expedients are also well-known to those skilled in the art.

The plant to be described hereinafter is merely exemplary of the basic plant embodying the features of the present invention. The size of the plant, the particular configuration and arrangement thereof and the efficacy thereof is a matter of design relating to the particular type of waste water influent to be treated and the quantity thereof. Thus, it will be understood that the specific plant described is described by way of example and not by way of limitation to the fundamental principles and improvements described hereinafter.

The plant illustrated in FIGS. 1 and 2 is designed to treat 600,000 gallons per day of influent of domestic sewage. After treatment by the comminutor or the screening 14, the influent sewer line deposits the influent in an equalization tank 16. The purpose of the equalization tank is to even out surges of influent which occur periodically during the day and also, to the maximum extent possible, to make the waste water being treated by the balance of the plant uniform in quality. That is to say, the contents of the influent may vary over a 24-hour period and the purpose of the equalization tank is to even out to the maximum extent possible the variations in content so that the remainder of the plant can deal with waste water of as constant quality as possible. As already noted, in addition, the equalization tank serves as a reservoir to provide for relatively constant flow of waste water through the balance of the system.

As may be seen by FIGS. 1 and 2, the bottom of the equalization tank 16 slopes toward the front center area 36, the slope being provided by three separate floor sections, a center section 38 extending from the front 40 to the center bottom 36, and two side sections 42 and 44 which slope from the sides toward the center. The influent is introduced into the equalization tank at the top thereof and after being held in the equalization tank it is drawn out through a pump suction pipe 46 in the approximate area of the center bottom 36 whereby to withdraw to the maximum extent possible any solids that may have settled down during the holding period in the equalization tank. As shown and as is preferred, an overflow skimmer 48 is provided in the equalization tank 16, said skimmer having its open inlet end 50 located at the desired surface level of the waste water being held in the equalization tank to permit the slow draining off of any oil, scum or solids floating on the surface. The skimmer 48 is connected by means to be described hereinafter to a pump 52 which wll direct the material flowing through the skimmer 48 into the sludge removal system for the plant. The sludge removal system will be described in a somewhat greater detail hereinafter in this specification.

As will best be seen in FIG. 1, the equalization tank 16, the settling tank 18, the flocculation tank 20 and the clarification tank 22 are all rectangular in plan view and share common walls between them which walls in certain instances serve as weirs for permitting waste water from one tank to spill over into the adjacent tank. This function however is not performed by the wall 54 separating tanks 16 and 18. As previously noted, the effluent from the equalization tank 16 is drawn off from the zone 36 at the center bottom thereof through a suction pipe 46 which is connected to a pair of pumps, preferably centrifugal pumps 56, here shown as two in number, although one is preferably employed at a time, the other being a spare. It will be obvious to one skilled in the art that a suitable valving mechanism 58 is included for directing the pipe 46 to the inlet of either one of the pumps 56. The outlet of the pump 56 is designed by the reference numeral 60 and discharges the equalized influent into a weir 62, preferably of the adjustable sawtooth type. The influent to the settling tank 18 collects in the weir 62 and spills over the weir, as is well known, into the settling tank. However, prior to the introduction of the influent into the weir 62, a suitable coagulant is metered into the pipe 60 in a way that insures intimate mixing thereof so as to produce a high degree of incipient floc in the settling tank 18 while the waste water is held in said settling tank. The coagulant may be any of a number of well-known coagulants, such as alum, ferrous chloride, ferrous sulfate, aluminum chloride and so forth. As is presently preferred, the coagulant is ferric chloride. When utilizing ferric chloride, the amount of ferric chloride should be somewhere about 30 and 70 milligrams per liter of waste water, and preferably about 50 milligrams per liter of waste water. It will be understood by those skilled in the art that different amounts of coagulant would be employed if a different coagulant were used. Moreover, as is well known to those skilled in the art, the particular coagulant used will depend on the nature of the waste water. However, for usual kinds of domestic waste water, we have found ferric chloride to be emminently suitable.

Disposed within the settling tank 18 is an adjustable overflow 64 which extends back to the equalization tank 16, the adjustable overflow being included for controlling the flow of the waste water through the tanks 18, 20 and 22 of the waste water treatment plant 10. Thus, as is well known, by raising the level of the inlet or upper end of the overflow 64, less waste water in settling tank 18 will be returned to the equalization tank 16, whereby to cause more of said waste water to flow to the tanks 20, 22 and 24 to thereby increase the amount of flow toward the sump 24. Conversely, when the upper end of pipe 64 is lowered, more of the waste water in settling tank 18 will be returned to the equalization tank whereby to reduce the amount of flow from the settling tank to the flocculation tank, the clarification tank and finally to sump 24.

As may best be seen from FIGS. 1 and 2, the bottom of the settling tank is in the form of an inverse pyramid whereby to provide for a collecting area 66 for the removal of sludge that falls to the bottom of the tank and down its converging walls to the sludge collection area 66. The removal of sludge from the area 66 is accomplished by means of a draw pipe 68 that extends to the inlet of the pump 52 for withdrawing sludge from the area 66. Connected to the draw pipe 68 is the pipe 48 extending from the equalization tank 16 as was previously described. Thus, the pump 52 is effective for withdrawing particulate material from both the equalization tank and the bottom of the settling tank. It should also be noted that there is a skimmer 70 in the settling tank 18, the top of the skimmer being located at about the level of the surface of the waste water in the settling tank. The skimmer 70 serves a function quite similar to the function of the skimmer 48 in the equalization tank, namely, to draw off any of scum, oil, grease or other floating materials on the surface of the waste water in the settling tank. The lower end of the skimmer is connected, preferably through a valve 72, to the pipe 68 and thence to the inlet of the pump 52. The outlet from the pump 52, designated by the reference numeral 74, is connected to a sludge pipe 76 that extends to a sludge bed (not shown).

The average retention time for the waste water in the settling tank is approximately 20 minutes, although this will vary depending upon conditions of the waste water. During the time that the waste water is in the settling tank, there will be some slight circulation due to the movement of the liquid through the settling tank from the equalization tank to the flocculation tank. This will be enough, along with the manner of introduction of the coagulant, to insure uniform distribution of the coagulant in the waste water in the settling tank, whereby to promote the uniform formation of incipient floc of relatively small size.

The waste water from the settling tank, together with its entrained incipient floc formed by the reaction of the waste water with the coagulant, e.g., ferric chloride, exits from the settling tank by passing under a semi-cylindrical baffle 78 mounted on the partition wall 80 between the settling tank 18 and the flocculation tank 20 and having an open top and bottom. The top of the baffle 78 preferably extends above the surface of the waste water in the equalization tank and the settling tank whereby to insure that all of the liquid passing into the space between the baffle 78 and the wall 80 passes through the bottom of said space. Disposed within the space between the wall 80 and the baffle 78 is a pipe 82 for feeding a polyelectrolyte to the waste water in said space. The purpose of the polyelectrolyte is to form large size heavy floc from the incipient floc produced by the coagulant as hereinbefore described. Thus, the nature of the polyelectrolyte will be dependent upon the nature of the coagulant and of the waste water itself. For a waste water of conventional domestic type having a pH of approximately 7.2 to 7.3 and wherein the coagulant is ferric chloride as hereinbefore described, an excellent polyelectrolyte is a high molecular weight anionic polyelectrolyte such as that sold by Carus company under the designation AP-91 and doses of approximately 0.5 mg/1 have been found exceedingly effective. Clearly however, this invention is not intended to be limited in any way to that particular polyelectrolyte or to a high molecular weight anionic polyelectrolyte - ferric chloride system, these being shown by way of preferred example for domestic sewage of the type described, and not by way of limitation.

To assist in the uniform distribution of the polyelectrolyte in the waste water as it passes out of the settling tank and into the flocculation tank, a conventional stirrer 84 has its blades 86 disposed within the space between the wall 80 and the baffle 78, preferably at about the level of introduction of the polyelectrolyte into said space, whereby to rapidly uniformly distribute the polyelectrolyte to the waste water as it passes through said space. Thus, when the waste water with polyelectrolyte passes over the submerged weir 88 forming the lower surface of a submerged passage 90 in the wall 80, it already has disseminated therethrough polyelectrolyte for promoting the growth of floc. It will be noted that the width of the weir 88 is equal to the diameter of the semicylindrical baffle 78 and is disposed within the space bounded by said baffle whereby to insure that all liquids passing from the settling tank to the flocculation tank must pass through the baffle space and be provided with polyelectrolyte.

As may be seen readily from an examination of FIGS. 1 and 2, the inner configuration of flocculation tank 20 is essentially the same as the configuration of the settling tank 18. Thus, the bottom of the flocculation tank 20 is pyramidal in configuration whereby to provide a lower most collecting zone 92 adjacent which is disposed the inlet end of a sludge draw pipe 94 which is connected to the inlet of a sludge pump 96, the outlet 98 of which is connected through a suitable valve 100 to the sludge pipe 76. Likewise, as may best be seen in FIG. 2, a skimmer 102 is provided in the flocculation tank 20 which skimmer has its upper end 104 disposed adjacent the surface of the waste water in said flocculation tank and the lower end thereof connected to the sludge draw 94 so that it will extend to the inlet of the pump 96. In addition to the presence of the polyelectrolyte in the flocculation tank 20, the major difference between the flocculation tank and the settling tank is the provision of a slowly rotating stirrer 106 preferably having a pair of spaced apart blades 108 and 110 for imparting to the waste water in the flocculation tank a slow circular movement for the purpose of permitting the growing floc in the flocculation tank to coalesce by contact with other floc. The rate of circular movement must be very low, of the order of 2 to 3 rpm, in order to insure that upon contact floc will coalesce and not be broken up by the shear forces resulting from velocity gradients present in the circular flow. The retention time in the flocculation tank 20 is preferably approximately 20 minutes, although, as heretofore noted with respect to the settling tank, this may vary depending upon the nature of the waste water and the volume of flow at the particular time.

To prevent the breakup of the floc which will grow in the flocculation tank as hereinbefore described, as the liquid with entrained floc passes from the flocculation tank to the clarification tank, the width of the submerged weir 112 between the flocculation tank and the clarification tank is relatively great as compared with the width of the submerged weir 88 between the settling tank and the flocculation tank. Thus, as may best be seen in FIGS. 1 and 2, the submerged weir 112 is the lower surface of an elongated passage 114 in the wall 116 between the flocculation tank and the clarification tank. Since the floc entrained in the liquid passing between these two tanks has grown to a considerable size, to prevent the floc from being broken up by the shear resulting from a velocity gradient at the weir, the velocity gradient must be kept to a minimum and this is done by widening the weir 112 as compared with the width of the weir 88. The waste water and entrained floc passing over the submerged weir 112 passes into the clarification tank between the wall 116 and a baffle 118 extending downwardly into the clarification tank from above the surface of the liquid in the clarification tank. This insures that all of the liquid passing from the flocculation tank into the clarification tank must more first to the lower portion of the clarification tank to pass under the bottom 120 of the baffle 118. This will position the liquid and create a floc blanket beneath the bottom of a lamina 122 which is included for the purpose of separating the floc which passes through the floc blanket from the liquid. The construction of the lamina is novel and forms one of the features of the present invention and will be described hereinafter in this specification. Suffice it to say for the present, the liquid with entrained floc moves upwardly through the lamina between adjacent plates, all of which are angularly related with respect to the horizontal and vertical, and during said movement, the floc will drop out of the liquid and onto the plates, thereby permitting the clarified liquid to move out through the top of the lamina 122 and through an exit pipe 124 in the wall 126 between the clarification tank 22 and the sump 24. Thus, the liquid in the sump 24 will have a very low content of entrained solids, and the solids that are present will be only a very small particle size, as larger heavier particles will have been removed by the lamina 122. The removed solids will fall out onto the plates of the lamina 122 and will slide downwardly along the plates by the action of gravity and finally drop to the bottom of the pyramidal shaped clarification tank where they will be withdrawn by the sludge draw-off pipe 126 extending to the inlet of a pump 128, the outlet of which is connected to the sludge pipe 76 as can be seen in FIG. 1. Also connected to the inlet of the pump 128 is the skimmer 130, the upper end of which is disposed at about the surface of the liquid in the clarification tank for the purpose of drawing off oil, grease, scum or any other floating material in said liquid in said tank.

The purpose of sump 24 is to provide a reservoir for the clarified liquid which must be pumped through the remainder of the system, that is through the filtering means 26, the ozonator-sonicator 28 and the ozone contact tanks 30. The pumps for drawing clarified liquid from the sump 24 are designated by the reference character 132, there being two shown in FIG. 1. Actually, one pump is enough to handle the flow but two are provided so that there is a standby pump. Thus, various valving means 134 are shown for providing means for selecting which of the pumps 132 will be used at any particular time. The inlet to the pumps 132 is designated by the reference numeral 134 and is disposed at the bottom of the sump 24. At the outlet side of the pumps 132 is a pressure regulating control valve 136 of well-known type which, as is well known, by controlling the back pressure of the pumps 132 can control the amount of flow through the valve 136. Thus, the amount of liquid flowing through the valve 136 can be maintained constant as is desirable and preferred. It will also be noted that while not shown, it is preferred to include within the sump a conventional level control for turning on the pump when the level of the liquid in the sump 24 exceeds a certain predetermined height and for turning off the pump 132 when the level of the liquid in the sump 24 drops below a predetermined lower height.

The pumps 132, after pumping the clarified liquid through the regulating valve 136, pumps that liquid into two filters 26, each preferably of a mixed media type including both sand and anthrofilt (fine granular anthracite). The filters 26 are preferably of the well-known type which yield "filtration in depth" as is commonly referred by the skilled art worker. Preferably, such filtration in depth results in the filtering action taking place through the entire length of the filter path and for solid particles removed by the filter being retained by the filtering material along the entire length of the filter path. However, while such filtration in depth by a mixed media filter is preferred, it will be recognized that other forms of filters may be employed without departing from this invention. As may be seen from FIG. 1, the filters 26 are operated in parallel so that half of the liquid being pumped by one of the pumps 132 will pass through each. However, for purposes of backwash or other maintenance, valving means 138 are included so that all of the liquid can be caused to pass through one filter while the other is being backwashed, maintained, or the like. However, as already noted, preferably both are operated simultaneously.

As previously noted, from the output of the filters 26, the clarified and filtered liquid is sent through to a sonication-ozonation tower 28. The sonication-ozonation tower 28 may be of the type described and claimed in said aforementioned Bybel et al application, and especially in FIGS. 1 and 2 thereof, wherein the waste water inlet in said figures will be the effluent from the filters 26. We have found a significant increase in the efficacy of the sonication-ozonation process described in said aforementioned Bybel et al application when it is combined with a waste water treatment system of the type hereinbefore described. The marked improvement from said combination results in the fact that the particles being dealt with by the ozonation-sonication chamber are of a size and composition uniquely suited to the ozonation-sonication treatment which greatly enhances the efficacy thereof. As will be understood from the description presented hereinafter, the ozonation-sonication tower 28 is of a different type from that described by Bybel et al and that type will be described in detail in connection with FIG. 6 later in this description. Suffice it to say at this time, the liquid passing out from the sonication-ozonation tower 28 through the pipe 140 may already be sterile thus eliminating the need for further treatment of said liquid.

However, depending upon the nature of the waste water being treated and the volume thereof, the liquid in some cases may not be sterile as it exits from the ozonation-sonication tower 28 in which case it is preferred to provide ozone contact tanks 30 through which the effluent from the ozonation-sonication tower 28 passes for further ozonation to assure the substantial sterility of the effluent from the system at the outlet tank 142. Thus, and as best seen in FIGS. 1 and 2, the outlet pipe 140 from the ozonation-sonication tower 28 divides to three branch pipes 144, each of which leads to a weir 146 at the top of one of the ozone contact tanks 30. Disposed at the bottom of the ozone contact tanks 30 is a central manifold 148 from which six header pipes each with ten branch pipes 150 extend, 2 ½ feet in one direction and 2½ feet in the other. The branch pipes 150 are porous. Ozone for the ozone contact tanks 30 and the ozonation-sonication tower 28 maybe generated by any suitable ozone generator 152 which can convert air or oxygen to ozone. The selection of the particular ozone generator and of the particular gaseous medium for conversion is a matter of economics and will depend upon the particular system. If forms no part per se of the present invention. Suffice it to say however, the ozone generator must have sufficient capacity so that the liquid in the pipe 142 has an excess of ozone, preferably a residual ozone content of 0.1 to 0.2 milligrams per liter, and most preferably an excess of 0.15 milligrams per liter, thereby maximizing the likelihood that all of the oxydizable material in the liquid passing through the contact ozonation chambers 30, will have been oxidized by the ozone. However, it should be noted that the amount of excess ozone in the liquid in the pipe 142 should be very small as too large an excess of ozone may have certain adverse environmental effects.

If the ozone contact chambers 30 are employed, as is presently preferred, it will be seen that it is preferred to include six of them, the six chambers being arranged in three parallel groups of two series chambers each. The retention time of the liquid in each chamber should be approximately one-half hour, whereby for the liquid to pass through any two chambers in series, it will be contacted by ozone for a full hour. However, as previously noted, the ozone contact chambers 30 may be unnecessary in the event that the effluent from the ozonation-sonication chamber 28 meets the quality criteria established for the effluent in the pipe 142. In such instance, the ozone contact chambers 30 maybe bypassed entirely or omitted from the plant if desired.

The introduction of ozone into the ozonation-sonication tower 28 and into the ozone contact chambers 30 produces a foam which contains a sizable quantity of ozone which foam tends to rise to the top of the tower 28 and the chambers 30. This foam may be drawn off from the top of the tower 28 by a foam removal pipe 154 and from the top of the chambers 30 by foam removal pipes 156, all said pipes extending to a foam conducting pipe 158 that goes to a foam liquifying container and the inlet of a pump 160 (FIG. 1) and from the outlet of said pump 160 into the sludge pipe 76 whereby sludge in said sludge pipe 76 is ozonated to inhibit the growth of anaerobic bacteria therein. This is a desirable feature of the present system, but it is optional. Rather than utilizing the ozone in the manner described, if pure oxygen is the starting material for the ozone, the excess ozone could be recirculated through the ozone generator 152 in manners heretofore known or it might be directed to a gas holding tank (not shown) wherein it would be permitted to transform to oxygen and then be released to the atmosphere. Naturally, if recirculation is used, a drier should be inserted in the recirculation path to remove moisture.

As shown in FIGS. 1 and 2, the effluent pipe 142 extends to a holding basin 32 which is optional in the present invention. Thus, the effluent 142 after the treatment heretofore described, could be discharged directly into a stream or the sea, spread on the ground or the like without adverse effect. However, to conform to the statutory and regulatory requirements of certain state governments, a holding basin 32 may be necessary and such is included in the system being described. The retention time of the liquid in the holding basin 32 is preferably of the order of about 50 minutes, although, as already noted, this is not critical except to meet certain regulatory requirements. One advantage of including a holding basin 32 in the system, beyond that of meeting legal requirement of a state regulatory agency, is to provide a source of clean water for backwashing the filters 26, cleaning them out periodically after they have accumulated a sizable amount of solids during the normal operation as hereinbefore described. Thus, it will be seen that a pair of pumps 162, here shown as two in number in order to provide for a spare, only one being required for the backwash operation, have their inlets in the holding basin and their outlets connected through control valve 164 to a pipe 166 extending to the control valves 138 of the filters 26. By proper manipulation of the control valves, filters 26 can be sequentially backwashed, that is passing clear water from the pipe 166 through the filter in the reverse direction to that of normal flow, whereby to dislodge any entrapped solids and to remove them. The washing liquid with the removal solids from the filter being backwashed is passed through a pipe 168 to the equalization tank 16 wherein it may be recirculated through the entire system as already described. It will be obvious to the skilled art worker how to manipulate the valves 138 to employ the backwash operation on one filter at a time while maintaining the other filter operating in the normal manner.

THE LAMINA

Figure 7:
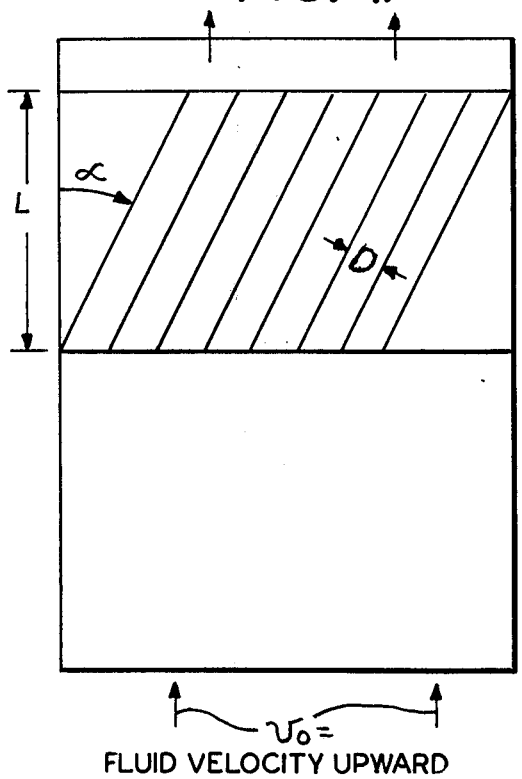
FIG. 7 is a vertical sectional view of the lamina shown in FIG. 6.

The preferred lamina for incorporation in the method and apparatus in the present invention is illustrated in FIGS. 7 through 8 wherein the lamina is shown in detail. As is true of all laminas, the lamina 122 is made of a multiplicity of parallel angularly oriented plates 200 that are spaced apart by a space D. The angle at which the plates are oriented and their spacing and the flow rate through the lamina may be optimized for removing the maximum amount of particulate material entrained in the influent of the lamina. This optimization is dependent upon the geometry of the container for the lamina, the flow rate of the plant, and the maximum permissible particle size of the effluent. The design of an optimum lamina given these parameters is determined by mathematical and physical analysis as hereinafter presented.

The present invention is based upon a thorough theoritical analysis of the basic principles operational in these sedimentation devices for both upflow and downflow. More particularly this invention concerns the optimal construction of such devices, i.e., it presents equations which functionally relate the angle of inclination of the substantially flat and parallel plates with the length of the plates and possibly other parameters, such that the maximum amount of solids that can be removed in a given tank size or for a given area of land surface whose normal points in the direction of the gravity vector. For this invention, the reference vector will either be vertical or horizontal depending upon the orientation of the tank and will point in the direction of flow. By substantially flat plates is meant the usual rectilinearly smooth surface as well as corrugated plates and plates which for strength reasons are slightly bent as well as sectionalized plates as will be hereinafter described. Parallel plates also include the case where the space between the plates has a wedge shape, although the angle of the wedge must be small.

This invention presents a derivation from fundamental principles of formulae which quantitatively describe the separation process of the parallel plates inserted in the fixed area. These formulae relate the settling velocity of the smallest particle which is to be totally removed by the device to the parameters of the design, such as angle of inclination of the plates, the length of the plates, and the distance between the plates. Also, if a rectangular device is to be installed in a circular area, the optimization is performed on the size of this rectangle. These optimizations are hereinafter carried out for many typical configurations, including both upflow and downflow for the installations of parallel plates into both vertical and horizontal tanks. Both rectangular and circular tanks (or available land areas) are considered. In the circular tank case, a rectangular sedimentation device is placed therein.

As was stated above, this invention applies to both rectangular and circular tanks placed in either a vertical or horizontal position. Also, it applies to upflow settlers where the suspended solids are removed from the same end of the plates as the influent enters, as well as the downflow case where the suspended solids are removed from the plate on the same end as the clarified liquid. Since the derivation of the equations which are applicable for each case are the same, except for certain algebraic signs and trigonometric functions, this derivation will be carried out in detail for only the case of upflow in a circular vertical tank. The equations obtained for the other cases wll simply be stated by the presentation of general equations which are applicable to the optimal design of any sedimentation device. The appropriate parameter choice for each particular case will be indicated.

Figure 3:
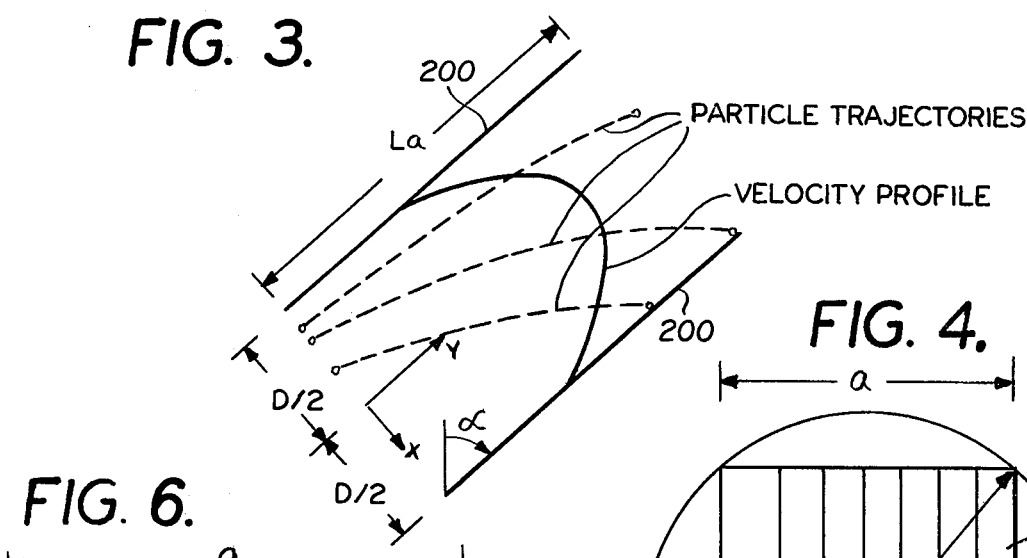
FIG. 3 is a diagramatic view illustrating particle flow between the plates of a lamina.

In order to understand the operation of these settling devices, the physics of the settling process occurring between the parallel plates must be quantified. FIG. 3 illustrates the potential paths that a particle may take as its is carried through the space between plates 200 by the fluid flow. As can be seen from this Figure, some of the particles with low sedimentation (downward) velocities are carried out from between the plates without sedimentation occurring. By a vectorial summation of the two contributing velocities (the fluid velocity and the sedimentation velocity), one obtains the following components for the velocity of a given particle in the x-direction and in the y-direction.

y-component $$v_y = \frac{3}{2} v_a \left[ 1 - \left( \frac{2x}{D} \right)^2 \right] - v_t \cos \alpha \quad (1)$$

x-component $$V_x = v_t \sin \alpha \quad (2)$$

For these equations, the angle and length reference vector points in the vertical upward; for the more general cases to be summarized later, the reference vector will point in the direction of the tank axis (or its equivalent in the restricted area case). In the above equations (1) and (2) $v_a$ is the average fluid velocity in the space between the plates; $v_t$ is the settling velocity of a given particle moving through this space, and $D$ is the distance between the plates. The velocity profile is that of laminar flow between plates as is the case for low Reynolds numbers. This laminar flow (equivalently a low Reynolds number) must be maintained to permit efficient sedimentation. The downflow of the suspended solids is assumed negligible, as is the case for the removal of particles from slurries with low concentrations of suspended solids.

Figure 4:
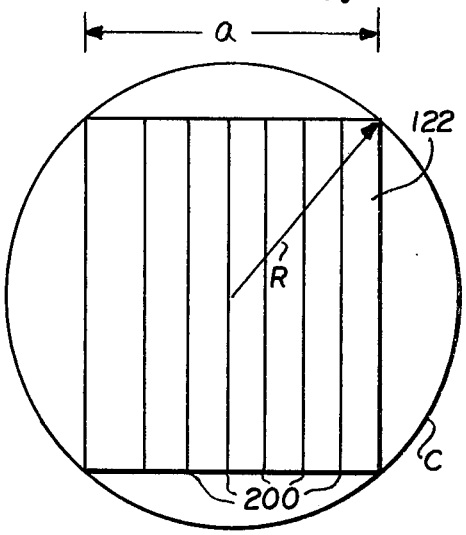
FIG. 4 is a diagramatic top plan view of a lamina disposed in a circular tank.
Figure 5:
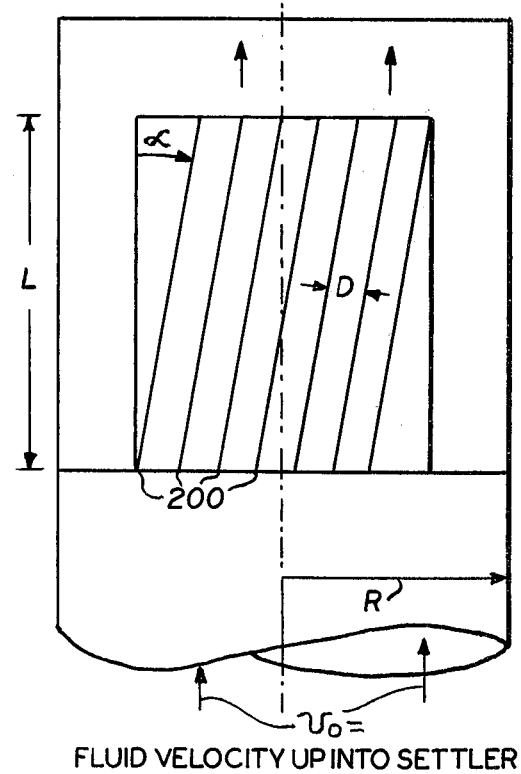
FIG. 5 is a diagramatic vertical sectional view of the tank of FIG. 4.

FIGS. 4 and 5 illustrate a rectangular lamina device 122 inserted into a circular tank C. As can be seen, the area available for flow through the rectangular area is smaller than that of the circular tank. For a given upflow velocity in the tank, $v_o$, the upflow velocity in the rectangular area is given by the following equation.

$$v_b = \frac{\pi R^2}{a \sqrt{R^2 - a^2}} v_o \quad (3)$$

Here $R$ is the radius of the sedimentation tank, and $a$ is the length of a side of the sedimentation device. However, the area of entrance to the lamina 122 is smaller than the area of the rectangle inserted in the circular tank. The relationship between the upflow velocity in the rectangle, $v_b$, and the upflow velocity entering the lamina, $v_c$, is given by the following equation.

$$v_c = \frac{a}{a - L \tan \alpha} v_b \quad (4)$$

Here $L$ is the height of the sedimentation device and $\alpha$ is the angle of inclination of the plates. The vertical upflow in the entrance to the lamina, $v_c$, is related to the average velocity of the fluid between the plates, $v_a$, by the following equation. This results from the fact that the velocity vectors are in different directions.

$$v_a = v_c/\cos \alpha \quad (5)$$

By back substitution, one is able to obtain the velocity components of a particle in the $x$ and $y$ direction (see FIG. 3) as a function of upflow velocity in the tank, settling velocity, and the design parameters for the lamina device.

y-component $$v_y = \frac{3}{2} \frac{\pi R^2}{(a - L \tan \alpha)(R^2 - a^2)^{1/2} \cos \alpha} \left[ 1 - \left( \frac{2x}{D} \right)^2 \right] - v_t \cos \alpha \quad (6)$$

x-component $$v_x = v_t \sin \alpha \quad (7)$$

These formulae which quantify the sedimentation phenomena will then be used to generate the equations for optimal design of the sedimentation device.

In general, one would prefer to design a lamina device such that when it was put in the circular tank, it would remove the maximum amount of suspended solids. To accomplish this task exactly requires the knowledge of the probability distribution of particle settling velocities in the influent suspension. Since this information is rarely known, and when known it is subject to experimental error, another approximate optimization objective must be chosen.

As an approximate objective for optimization, one could minimize the particle size (equivalently particle settling velocity), which will be totally removed as it passes through the space between the plates. Referring to FIG. 3, one is interested in a particle whose trajectory starts at the point $x = -D/2$ and $y = 0$ and ends at the point $x = D/2$ and $y = L_a$. Depending upon the parameters of the lamina device (i.e., angle of inclination, etc.), and the upflow velocity, $v_o$, a particle with a certain critical settling velocity, $v_{tc}$, will follow this trajectory. Any particle with a settling velocity above this critical velocity will be totally removed from the fluid, whereas those particles with settling velocity lower than this value will be only partially removed. The goal of designing the lamina sedimentation device to minimize this critical settling velocity will be the objective used in this invention. It can be shown that this design criteria very nearly approximates the design criteria for the maximum removal of suspended solids.

To determine the settling velocity corresponding to this critical settling velocity, the relationship between the x coordinate and the y coordinate of a settling particle must be attained. By noting the definition of velocity as the rate of change of the distance variable with time, $$dx/dt = v_x \qquad (8)$$

$$dy/dt = v_y \qquad (9)$$

one derives the following first order differential equation describing the trajectories of settling particles.

$$\frac{dy}{dx} = \frac{3}{2} \frac{\pi R^2}{(a - L \tan \alpha)(R^2 - a^2) \cos \alpha \sin \alpha} \left[1 - \left(\frac{2x}{D}\right)^2\right] - v_t \cot \alpha \qquad (10)$$

However, we are interested in one particular trajectory, i.e., the one beginning at $x = -D/2$ and $y = 0$ and ending at $x = D/2$ and $y = L_a = L/\cos\alpha$. Performance of the integration between these desired limits yields the following relationship for the critical settling velocity as a function of the design parameters of the system.

$$\epsilon = \frac{v_{tc}}{v_o} = \frac{\pi(D/r)}{[4-(a/R)^2][(a/R)\cos\alpha - (L/R)\sin\alpha][(L/R)\tan\alpha + (D/R)\cos\alpha]} \qquad (11)$$

where $v_{tc}$ = critical settling velocity, i.e., the settling velocity of the particle which follows the critical trajectory.

This equation has been rearranged such that the optimal ratio of settling velocity to upflow velocity is to be found. In other words, the optimal design of the sedimentation device is independent of the upflow velocity, $v_o$. Hence, for a given diameter of tank, the optimal sedimentation device can be designed without considering the flow or settling characteristics of the suspension to be clarified. These fluid characteristics need only be used in deciding upon the diameter of the sedimentation tank.

Inspection of equation (11) indicates that minimization of the critical settling velocity ratio can be performed with respect to three variables: the angle of inclination of the plates, $\alpha$, the height of the sedimentation unit, L, and the length of the side of the rectangle inserted in the circular tank, a. This function cannot be optimized with respect to the distance between the plates, D, because it is obvious both from the equation itself and from physical reasoning that the narrower the gap the better the sedimentation. The optimal width of the gap between the plates (D) must be obtained from the properties of the influent suspension. However, it should be noted that the relationships between the other three design parameters at the optimum are not strongly affected by the distance between the plates; this will be seen later.

To obtain the parameters $\alpha$, $a$, and L for the minimization of the value of $\epsilon$, one differentiates equation (11) with respect to these parameters and sets the derivatives equal to zero. These equations, as listed below, are used for the optimal design of a rectangular sedimentation device inserted into a circular tank.

$$2(a/R)^2 - (a/R)(L/R)\tan\alpha - 4 = 0 \qquad (12)$$

$$(a/R) - (D/R)\sin\alpha \cot\alpha - 2(L/R)\tan\alpha = 0 \qquad (13)$$

$$(L/R)(D/R)\sin\alpha - (a/R)(D/R)\cos\alpha - (L/R)^2\sec^2\alpha - \cot\alpha[(a/R)(d/R)\sin\alpha + (L/R)(D/R)\cos\alpha - (a/R)(L/R) + (L/R)^2\tan\alpha] = 0 \qquad (14)$$

In some cases, it may be of interest to design for an optimum with respect to all three variables, whereas in other cases, the optimum may be desired with one of the variables fixed. For example, one might want to specify the angle of the plates to insure that the suspended solids will slide off the plates and then search only for the optimum $a$ and L. For both of these hypothetical cases, the above equations are used, however, not all of them are used in each instance.

The problem of obtaining the optimum values for all three variables can be dismissed rather quickly since no such optimum exists. Upon trying to solve the above three equations simultaneously for the three design variables, one quickly ascertains that the solution exists as the angle approaches zero degrees from the vertical and the height of the lamina device approaches infinity. Such a solution is obviously not achievable in the practical world.

The realistic problems of finding the best values of the parameters a and L for a given angle, $\alpha$, and of finding the best values of $a$ and $\alpha$ for a given device length, L, are easily calculated using equations 12 through 14. For design with a predetermined angle, $\alpha$, one uses equations 12 and 13 to solve simultaneously for a and L. For given device height, L, the solutions of equations 12 and 14 produces the optimal values of the design parameters.

Figure 6:
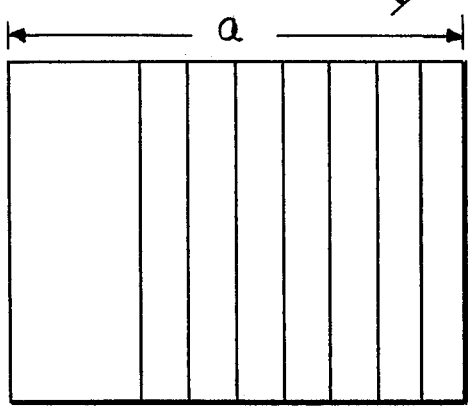
FIG. 6 is a diagramatic top plan view of a lamina disposed in a rectangular tank.

Beginning with the derivations of equations (1) and (2) above, the same procedure can be repeated for the other possible cases. For the cylindrical tank, one can consider the cases of the tank in a vertical position with the flow being either upward or downward, or the tank in a horizontal position with the flows again up or down. These same four cases can be developed for a rectangular shaped tank as shown in FIGS. 6 and 7. The results of these derivations can be summarized in three equations corresponding to the three design formulae for the upflow in a cylindrical tank given by equations 12 to 14. The reference vector for these equations points in the vertical or horizontal direction corresponding to the orientation of the tank and in the direction of the fluid flow. For each different case, some parameters of the equations are altered. These general equations are presented below (15 to 17)

$$2(a/R)^2 - (a/R)(L/R)\tan\alpha - 4 = 0 \qquad (15)$$

$$(a/R) - A(D/R)\sin\alpha f(\alpha) - 2(L/R)\tan\alpha = 0 \qquad (16)$$

$$A \ [(L/R)(D/R)\sin\alpha - (a/R)(D/R)\cos\alpha] - (L/R)^2\sec^2\alpha - Af(\alpha)\{(a/R)(D/R)\sin\alpha + (L/R)(D/R)\cos\alpha - B[(a/R)(L/R) - (L/R)^2\tan\alpha]\} = 0 \qquad (17)$$

where $$A = \begin{cases} +1 \text{ For upflow} \\ -1 \text{ for downflow} \end{cases}$$

$f(\alpha) = \cot \alpha; B = +1$ for vertical tanks
$f(\alpha) = \tan \alpha; B = -1$ for horizontal tanks $$a/R = \begin{cases} \text{variable for cylindrical tanks} \\ 1 \text{ for rectangular tanks} \end{cases}$$

For cylindrical tanks, one always uses equation (15) and along with it either equation (16) or (17) depending upon which of the parameters, $\alpha$, or L/R are given. If L/R is a preset design value, then 15 and 17 are used to determine the angle, $\alpha$, and the ratio $a/R$. For a given angle $\alpha$, one uses equations (15) and (16). For the case of rectangular tanks, only equations (16) and (17) are used with $a/R$ set equal to one. Equation 16 is used for a given angle a to find the optimal value of the device length, L/R or equivalently L/$a$. For a given value of L/$a$ equation (17) supplies the required optimal angle $\alpha$.

A typical example of the use of these equations for the design of sedimentation devices will be given in the following presentation of the preferred embodiment of the invention wherein the tank is rectangular.

A lamina 122 of the present invention has been made in accordance with the mathematical analysis as above presented wherein in a lamina tank that is 12 feet long, 6 feet wide and 16 feet deep is employed, the lamina plates 200 being 6 feet long and disposed at an angle to the horizontal of 70°. The plates 200 are spaced apart by a space "D" that is equal to 2 inches. This arrangement has been found very effective in treating domestic sewage that has previously been treated with a coagulating agent and polyelectrolyte for the flocculation of numerous solids therein.

The lamina of the present invention may be (and is in the desired embodiment) of great size and means are provided to facilitate its fabrication and installation so as to make it practical to construct and maintain laminas of such mass. Thus, the present lamina is made of a multiplicity of plates that have been sectionalized and are joined by connecting members into which the plates are press fitted and preferably cemented so as to greatly facilitate the ease of the fabrication. In addition, the lamina is preferably built in a number of separate sections that are placed into side-by-side relation to function essentially as an integral whole.

Figure 11:
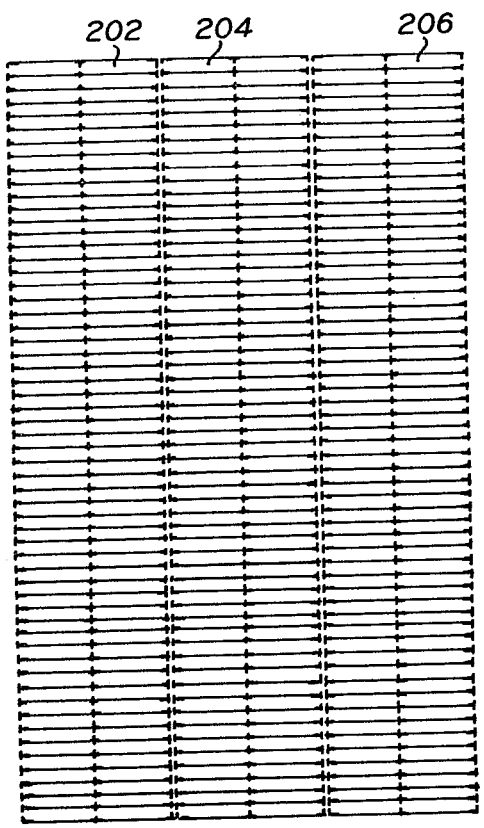
FIG. 11 is a top plan view of the preferred form of lamina embodying the present invention.

As may best be seen in FIG. 11, the lamina is preferably made of three longitudinally extending sections which are in side-by-side relation. These sections are designated 202, 204 and 206. The three sections are identical and interchangeable as to position. Portions of section 202 and 204 are shown in FIG. 8 and will be described in detail.

Figure 12:
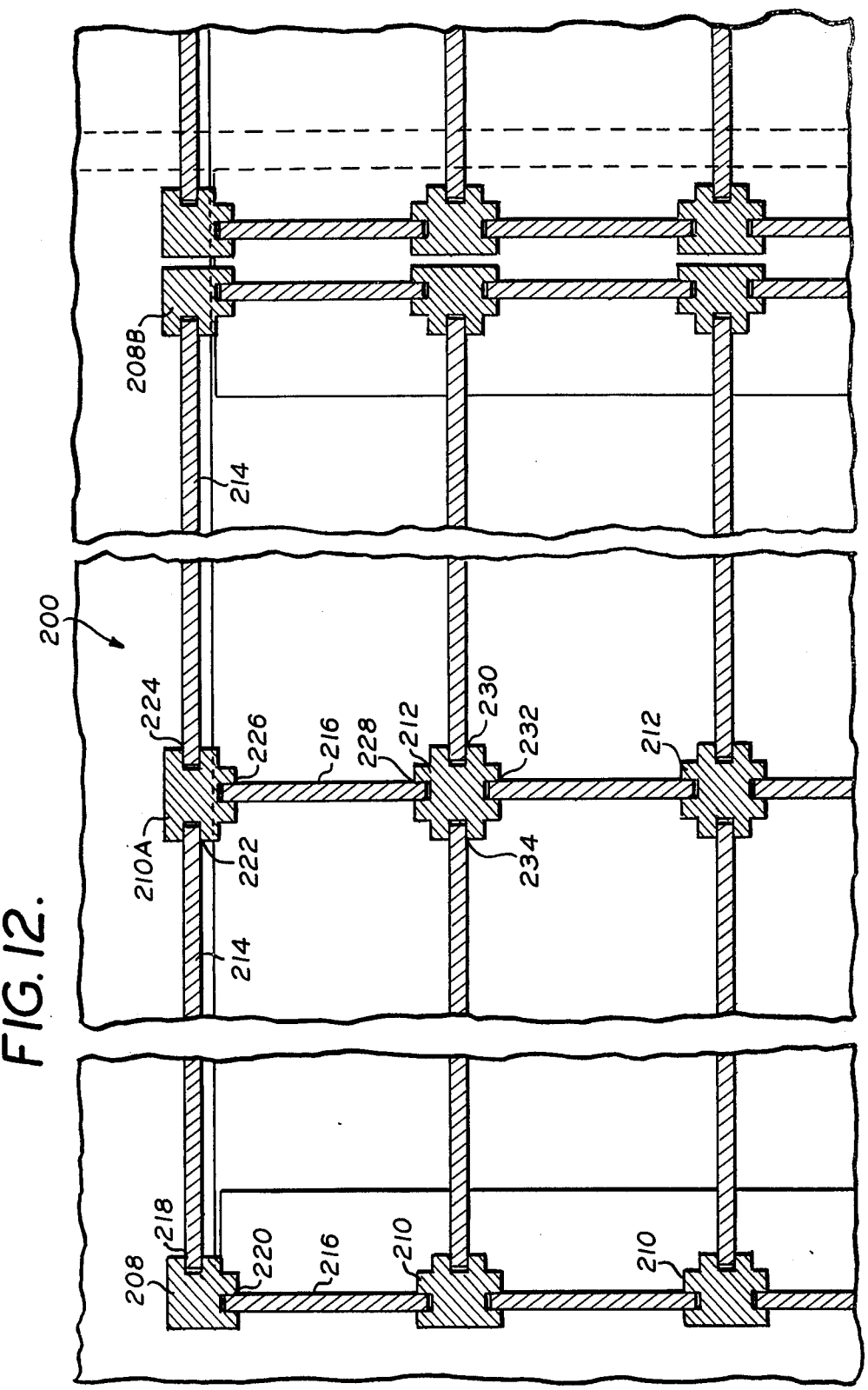
FIG. 12 is a fragmentary top plan view in enlarged scale of the lamina shown in FIG. 11.
Figure 19:
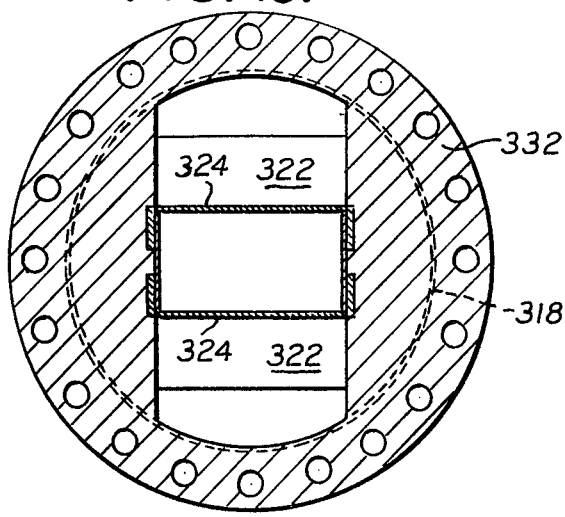
FIG. 19 is a plan view of the mounting plate for the low frequency transducers.
Figure 16:
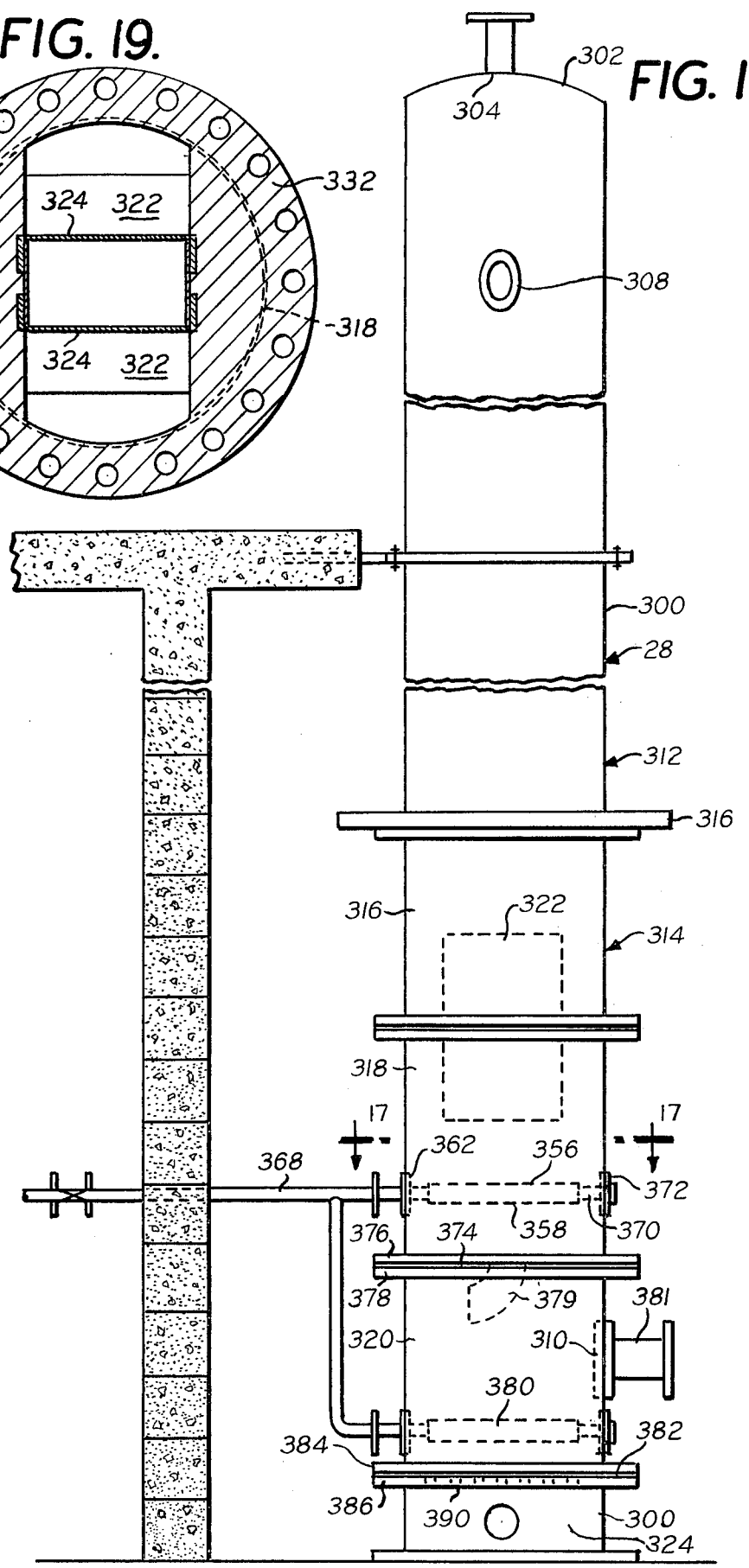
FIG. 16 is a side elevational view of the ozonation-sonication tower of the present invention.
Figure 17:
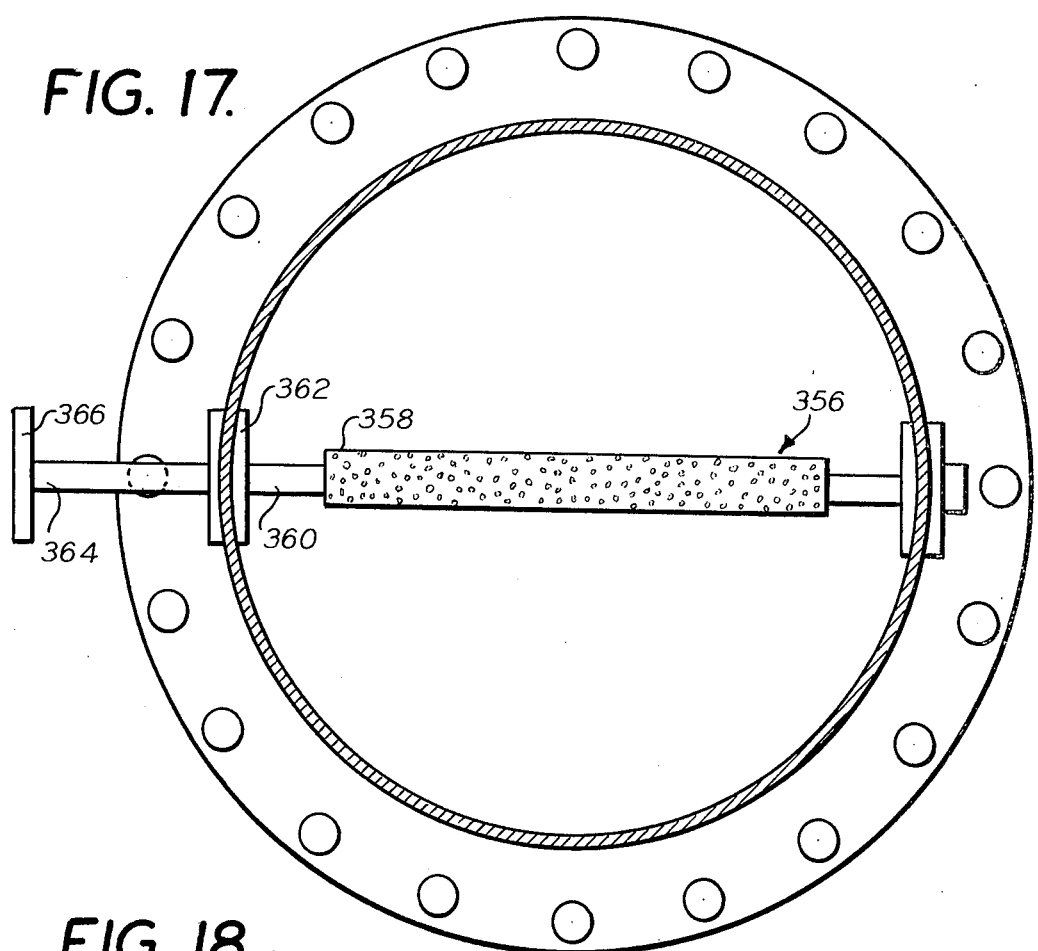
FIG. 17 is a sectional view taken along the line 15—15 of FIG. 14.
Figure 18:
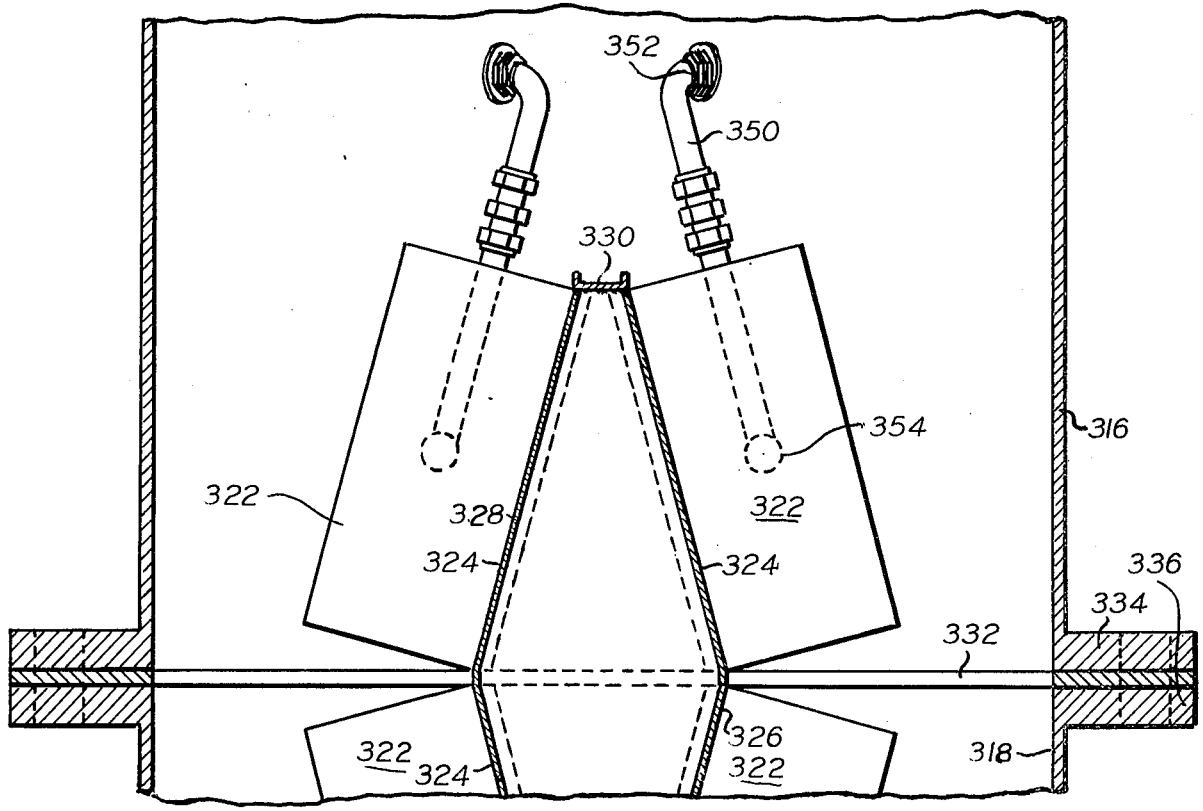
FIG. 18 is a view partially in elevation and partially in section illustrating the mounting of the low frequency transducers in the ozonation-sonication tower.

Specifically, the section 202 is formed of a plurality of elongated corner members 208, T-members 210 and cross members 212 between which are plate modules 214 and spacers 216. The corner member 208 are essentially square in cross section and are provided with grooves in two mutually perpendicular longitudinally extending surfaces, the grooves being designated by the reference characters 218 and 220. The T-members are rectangular in configuration and are provided with three grooves, two in longitudinally extending surfaces parallel to one another, the grooves being designated by the reference characters 222 and 224, and a third groove 226 in the longitudinally extending surface perpendicular to the other two and extending therebetween. The cross members 212 are essentially square in cross-section and are provided with four grooves 228, 230, 232 and 234, one in each of the longitudinally extending surfaces of the member. All of the members 208, 210 and 212 are long, preferably the same length as, or slightly longer than, plates 200, namely, about 6.4 feet. The corner members 208 are spaced apart the width of the module 202. However, the plate modules 214 are approximately one-half of the width of the module, there being interposed in the middle of the module the T-member 210 in order to permit the introduction of central spacers 216 to give the module adequate stiffness for ready handleability. Spacers 216 have a width about equal to the space D, although this may be somewhat modified to compensate for the presence of T-members, cross-members and side members. The plate modules 214 are slid into the grooves 218 and 222, preferably after the application of a suitable cement, thereby to form a firm rigid construction between the corner member 208 and the T-member 210 and the plate module 214. Likewise to the right of the T-member 210A, the right hand plate module 214 is glued into the groove 224 and into a groove in the corner member 208b at the right side of the front of the module as was in FIG. 8. The remainder of the construction will be apparent to anyone skilled in the art as he views FIG. 12, whereby to build a grid construction approximately two plate module 214 wide and as long as the number of plates being installed in the lamina, this being determined by the design parameters hereinbefore presented. Each of the modules 204 and 206 is constructed identically with the module 202. Thereafter, the modules 202, 204 and 206 may be placed into the lamina tank 122 and may be supported by any suitable underlying support structure such as, for example, a plurality of angle iron supports which underly the modules and hold them at the desired depth. These angle irons may be seen in FIGS. 7 and 8, wherein they are designated by the reference characters 236.

Figure 10:
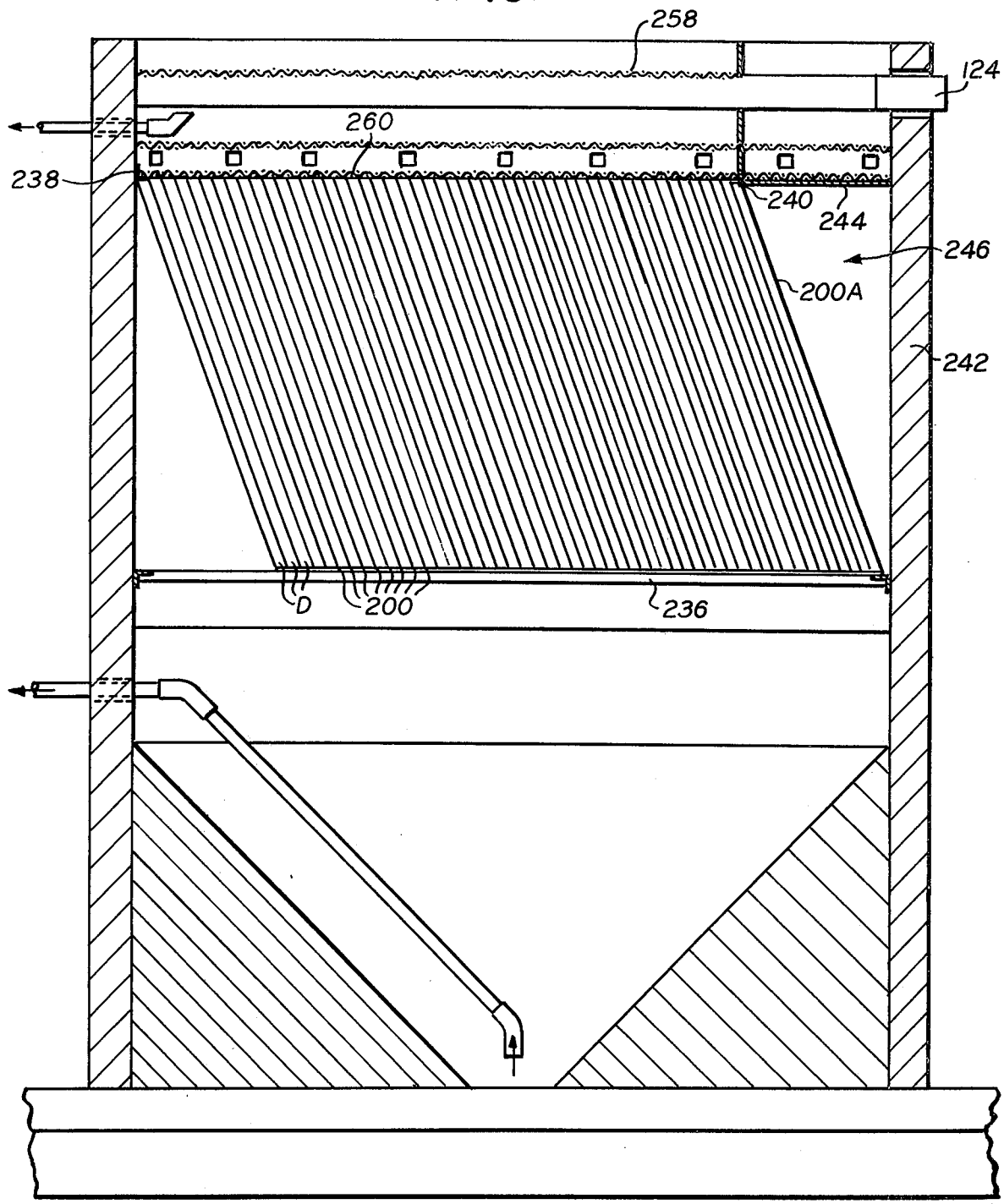
FIG. 10 is a sectional view taken along line 10—10 of FIG. 8.

With the modules in place, to hold them securely, as shown in FIG. 10, a pair of transversely extending angle irons 238 and 240 may be bolted in place above them to hold them secure. From the front most plate 200A in FIG. 10 over to the wall 242 of the tank, there is preferably disposed a plate 244 for preventing liquid from falling into the space 246, whereby to prevent the slow deposition of particles within such space which would require periodic cleaning. However, if the periodic cleaning is not deemed burdensome, the plate 244 may be dispensed with.

Figure 13:
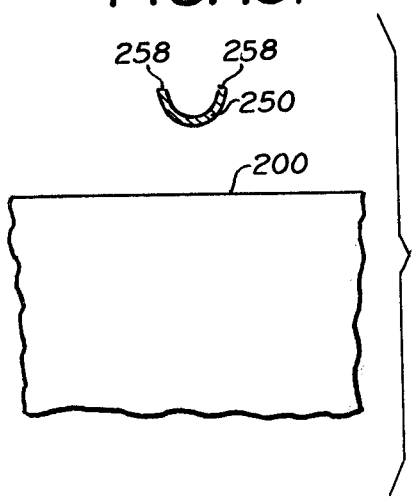
FIG. 13 is a sectional view taken along line 13—13 of FIG. 8.

One of the major problems in the design, construction and utilization of laminas is to insure that the flow between each pair of adjacent plates will be essentially the same as the flow between every other pair of plates. The reason for this is that if the flow is uneven, the particle distribution exiting at the top of the plates will be different, thereby to give an uneven and undesirable separation of particles for the overall lamina. That is to say, that if the average flow through the lamina or the total flow through the lamina is what is desired, but the flow between certain plates is to high, then, based on the analysis already presented, the particles entrained in the liquid flowing through that high velocity pair will be too large for the design of the lamina. The numbers entrained will also be too numerous. To eliminate this, means are provided herein for equalizing flow throughout all of the lamina and the preferred means are shown in FIGS. 8, 9 and 10. In accordance with these figures, in the preferred form of means for eliminating unequal flow, a plurality of troughs, here shown as three in number and designated 250, 252 and 254 extend the length of the lamina 122 and are joined together at 256 to provide for an out flow of the effluent through the effluent pipe 124. The number of troughs forms no part of the present invention and may be any number from one on up. However, a practical number above one, such as three, is preferred as the more troughs that are included, the slower will be the velocity of the liquid spilling over into the troughs and the greater will be the separation of unwanted particles from the liquid. The troughs are shown to be disposed above the tops of of the plates 200, and preferably substantially above the tops of those plates, of the order of at least about 7 inches. In the preferred form of the invention being described herein with the lamina and size of construction heretofore as described in detail, we have found that the top edges 258 of the troughs are preferably about 12 inches above the tops of the plates 200 (see FIG. 13). The diameter of the troughs may be of the order of about 6 inches for a lamina of the size presently being described. However, the diameter is not critical and merely is a matter of convenience for fabrication and for handling the flow of the liquid to flow therethrough.

With the troughs 250, 252 and 254 so located, as the liquid passes up through the lamina between plates 200, depositing particulate material as it travels, it will exit at the upper ends of the plates 200 where it will encounter substantial head of clarified liquid as already described. This substantial head of clarified liquid serves to equalize the pressure across the entire surface of the lamina, whereby to equalize the flow of the liquid between each of the pairs of plates. The maintenance of the head at the desired value, coupled with a very low spill velocity of clarified liquid flowing into the troughs will yield an exceedingly high quality effluent with very little entrained particles and these of very small particle size. The clarified liquid will work its way from the top of the plates 200 upwardly and, if necessary, sideways, until it encounters one of the edges 258 of a trough whereupon the liquid will spill over the edge and into the trough to be slowly carried towards the effluent pipe 124. The edges 258 of the troughs can be very carefully controlled as to their height so that one achieves a very long weir whereby to keep the velocity of the liquids spilling into the weir very low. With such a low velocity for the liquid as it pours over the weir, any entrained particles of significant diameter will not be able to maintain themselves at the surface of the liquid. If the height of the liquid is carefully adjusted so that it will be very little above the trough edges 258, these larger particles will not move over the edges 258, but will impinge on the sides of the troughs 250, 252 and 254 and will thereafter fall downwardly, perhaps through the plates to the bottom of the lamina plant. Preferably, although not necessarily, the edges 258 of the troughs may be sawtoothed, whereby to use the well known expedient of a sawtooth weir which enables the manufacturer to adjust the weir to precisely the desired level, vis-a-vis the water level. This is a well known expedient and forms no part of the invention per se.

Other means for equalizing the flow of liquid through the lamina can be employed as an alternative or in addition to the high head of clarified liquid as hereinbefore described. Thus, as shown in FIGS. 7 and 8, a screen 260 is disposed above the tops of the plates 200, preferably resting thereon, which screen is of mesh size such as to permit the largest particles that theoretically may pass through the lamina to pass through the spaces in the screen without interference. Thus, the screen does not serve as a sieve to prevent the passage of particulate material therethrough. The purpose of the screen is to serve as a wide area throttle to reduce the flow of liquid that may be flowing more rapidly than desired and thereby causing a slight increase in the flow of the liquid that is flowing at less than the velocity designed for the lamina to thereby achieve substantially uniform flow. Preferably the mesh size of the screen is not significantly above that required to permit the passage of particulate material therethrough as the smaller the mesh size of the screen, the more uniform will be the throttling action and hence the more uniform will be the flow therethrough.

Figure 14:
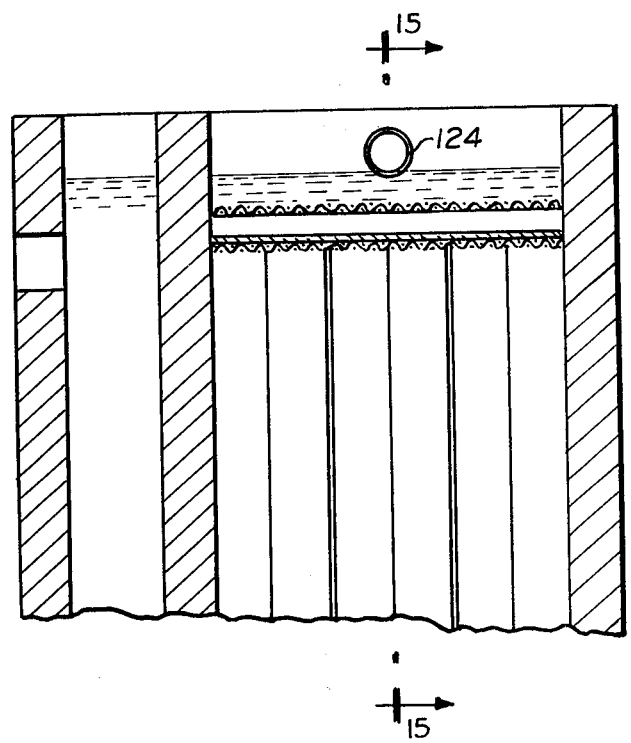
FIG. 14 is a view similar to FIG. 9 illustrating a modified lamina embodying this invention.
Figure 15:
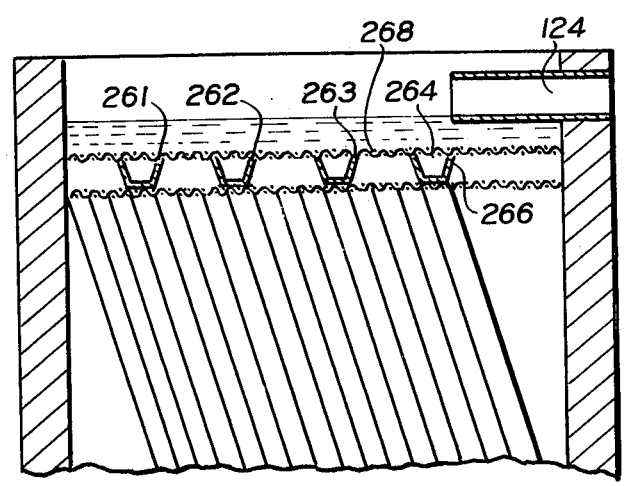
FIG. 15 is a sectional view taken along the line 15—15 of FIG. 14.

As shown in FIGS. 14 and 15, other means may be incorporated to further reduce particulate material that has passed between the plates 200 of the lamina 122. Thus, for example, if the throughs 250, 252 and 254 are not included, a plurality of transversely extending troughs 260, 262 and 264 may be included, the word transverse herein being employed to mean transverse to the direction of flow of the liquid above the plates 200. As the liquid leaves the tops of the plates and flows towards the weir 266 in the lamina 122 of FIGS. 14 and 15, it will be forced to pass over the troughs 261, 262, 263 and 264, which troughs will block out the vertically moving liquid that exits between the tops of the plates in their respective vicinities. Thus, the troughs will provide eddies in which there is no upward velocity component in the flowing liquid. With no upward component entrained solids in the horizontally moving liquid that is moving across the top of the lamina towards the weir 266, there will be insufficient upward force to maintain the solids entrained therein and the solids will drop out into the transversely extending troughs, whereby to further clarify the liquid that has passed through the lamina. Thus, the liquid leaving the lamina by passing over the weir will be further reduced in its particulate content.

While the use of the troughs 261, 262, 263 and 264 described herein, as illustrated in FIGS. 14 and 15, in combination with the screen 260, it will be understood that the troughs 261, 262, 263 and 264 may be employed without the close cooperation of the screen, and, of course, the screen 260 may be employed without the use of the troughs. When the troughs are employed, with or without the screen 260, they will accumulate within them significant quantities of particulate material as the lamina is employed. The troughs may be cleaned either by making them readily removable whereby they may be lifted out from the lamina periodically and flushed to remove the particulates or they may be cleaned hydraulically by providing a plurality of jets at one end of each of the troughs which will flush the troughs while they remain in position.

If desired, the combination of the troughs and screens may be further enhanced with respect to the quality of uniform flow throughout by providing a second screen 268 on top of the troughs 262, 264 and 266, in which event the troughs will serve not only in the capacity hereinbefore described, but will also serve as spacers between the two screens. In the alternative, the two screens may be employed with ordinary spacers 269 to hold the screens in slightly spaced apart relation, which spacing enables an additional increase in uniformity of flow throughout the lamina (see FIGS. 9 and 10).

The lamina is constructed as previously described in assembling the supporting members, that is the corner members 208, the T-members 210 and the cross members 212, with the intervening plate modules 214 and spacers 216 to form the section of lamina, which sections have been designated by the reference characters 202, 204 and 206. The lamina sections are then disposed within the tank 122 in side-by-side relation and are preferably secured in such position by the angles 238 and 240. A cover plate 244 may be provided to extend from the top of the forwardmost lamina plate 200A to the wall 242 of the lamina tank. Thereafter, if the troughlike weirs 250, 252 and 254 are employed, the central weir 252 is preferably first disposed between the front and back walls of the lamina tank and is leveled to make sure that it is at the right vertical position above the tops of the lamina plates. Then the side troughs 250 and 254 are set in, their rear ends being secured to the rear wall of the lamina and their forward ends being joined to the central trough 252. In this position, the troughs 250 and 254 are also leveled and are made co-planar with the weir trough 252. The level at which the tops of the weir troughs is set is one of choice and in choosing the location, the designer must take into account the desirability of a significant hydraulic head above the lamina plates as well as take into account the amount of flow which the plate is designed for. With such construction completed, the lamina is ready for use. In the alternative embodiment of FIGS. 14 and 15, after the lamina of the structure of FIGS. 7 and 8 is completed and installed as heretofore described, the screen 260 may be laid over the tops of the plates and the lamina is ready for use. If the transversely extending troughs 261–264 are employed, they may be disposed within the lamina tank with the bottoms of the troughs relatively close to the tops of the lamina plates. The transversely extending troughs may be secured to the side walls of the plate if desired. Naturally, if the second screen 268 is to be employed, this would be laid over the tops of the transversely extending troughs. The use of the lamina is the same as for all previously known laminas. Essentially, the liquid is introduced into the lamina tank beneath the plates and is permitted to flow upwardly between the plates and thence outwardly over the weirs, either a straight weir as in FIGS. 14 and 15 or the trough-type longitudinally extending weirs of FIGS. 8, 9 and 10, and thence to the effluent exit 124.

While the screens illustrated herein are shown to be stationary, it will be obvious that the screens should be removable for periodic cleaning. Thus, the screens can be disposed in frames that are releasably mounted as illustrated in the drawings.

An alternative to removable, stationary screens would be to have the screens movable whereby to present periodically fresh screening to the lamina while the remainder is removed from the screening position. This can be accomplished by having the screens mounted on rollers, one roller being the feed roller, the other being the take up roller, the rollers being disposed on opposite sides of the lamina. Manual, semi-automatic or automatic means can be provided for continuously or periodically shifting the screens toward the take up roller whereby to present fresh clean screening to the top of the lamina.

Still another alternative for reducing the fouling of the screen is to mount screens of an oscillatory mechanism for oscillating or reciprocating the screen in close confronting relation with one end of the lamina, generally the top. The movement of the screen will not effect its ability to throttle. However, the movement will reduce the likelihood of the screen becoming foul.

OZONATION-SONICATION CHAMBER

The ozonation-sonication chamber of the present invention is illustrated in detail in FIGS. 16, 17, 18 and 19 of the drawings. As previously noted, the ozonation chamber 28 can be of any desired construction without departing from the overall systems aspect of this invention. However, the ozonation-sonication chamber shown in FIGS. 16 to 19 is presently preferred for incorporation within the system as it has been found to be extremely effective in the oxidation of and the sterilization of waste water.

The ozonation-sonication chamber 28 preferably is formed of a long cylindrical tower 300 having a top 302 with an aperture 304 therein, the bottom of the tower 300 being placed on a suitable pedestal chamber 306 which seals the bottom of the tower and provides an enclosure for apparatus to be described hereinafter. The top aperture 304 is included as an outlet to draw off foam that may be formed as a result of the ozonation and sonication of the clarified waste water. Provided in the wall of the tower 300 is an inlet opening 308 for influent from filters 26. The tank is also provided with an outlet opening 310 adjacent the bottom thereof, the outlet opening leading to the ozone contact chambers 30 if necessary. Otherwise, it may go directly to a holding tank 32 or to final discharge for the system. For convenience of construction and maintenance, the tower 300 may be constructed in two main sections 312 and 314 which are joined by means of a flange-type joint 316. However, this is optional, although preferred. The section 312 is essentially a conduit for permitting the influent that enters through the inlet 308 to move downwardly through the tower. However, as will be understood hereinafter, liquid progressing through the section 312 will be exposed to both sonic energy and to ozone for pre-treatment prior to reaching the zone of maximum ozonation and sonication in the vicinity of the ozone injectors and ultrasonic transducers that will be described hereinafter. For convenience of construction and maintenance, section 314 is constructed of three separate sub-sections 316, 318 and 320 to facilitate the incorporation into the section 314 of the transducers and ozonators as will be described.

We have discovered that the best results when using ozone and ultrasonic vibrations are achieved when the liquid being treated encounters the ultrasonic vibration prior to or simultaneously with the ozone and not after it has been ozonated. Thus, it will be seen that the transducers and ozonators hereinafter described are arranged to provide this sequence of events.

Specifically, two sets of ultrasonic transducers are employed in the ozonation-sonication tower 28, these being designated by the reference characters 322 and 324. The set 322 are preferably of relatively low frequency just into the ultrasonic range, for example, about 20 kilohertz. Preferably, the transducers 322 are four in number and are of the magnetostrictive type. As may best be seen in FIG. 18, the transducers 322 are mounted on the four exposed surfaces 324 of a rhomboidal shaped mounting frame 326, the surfaces being defined as the outer surfaces of four plates 328 making up the frame. The plates are joined at their tops and bottoms by channels 330. The rhomboidal frame 326 is mounted within the wall of the tower 300 and joined between the sections 316 and 318 by means of a mounting plate 332 that is held between flanges 334 and 336 on the bottom of section 316 and the top of section 318, respectively. The flanges are joined together by suitable bolts (not shown). The mounting plate 332 may be seen in FIG. 19 and is essentially circular in periphery, provided with a plurality of bolt holes 334 and a central aperture of substantial size which is designated by reference numeral 336. The apertures 336 is preferably shaped to have two parallel edges 338 and 340 that are linear and a pair of arcuate end edges 342 and 344 that are concentric with the outside of the plate, the arcuate ends extending between the ends of the side edges 336 and 338. Welded to the side edges 336 and 338 are a pair of mounting plates 346 and 348 that are vertically extending and that are shaped essentially the same as the mounting frame 326. The mounting frame is preferably welded to plates 346 and 348. The transducers 322 are mounted on the four surfaces 324 of the mounting frame by any suitable means such as bolts (not shown). The transducers and the aperture 336 along with the mounting frame itself are proportioned so that there will be a large passage around the transducers and through the aperture 336 for the downwardly moving liquid to pass through without significant obstruction. The purpose of the angular mounting of the transducers 322 is to avoid sonic energy from reflecting off the tower wall back to the transducers 322 as such reflection could potentially degrade or destroy the transducers.

Each of the transducers require power to be supplied thereto. Thus, each of the transducers is fitted with a conduit 350 extending from an inlet opening 352 in the wall of the tower to an opening 354 in the transducer itself. Conductors extend through the conduit 350 from an ultransonic generator outside of the tower to the input leads for the transducers 322. As previously noted, the ultrasonic generator for the transducers 322 preferably operates at a frequency of about 20 kilohertz.

As previously noted, the ozonation-sonication tower 28 is arranged so that sonication occurs in advance of or simultaneously with ozonation. As will be more fully understood hereinafter, we provide herein two separate places for the introduction of ultrasonic energy, namely, by the transducers 322 and then again by the transducers 324 which are described hereinafter. Beneath the transducers 322 is an ozonator 356 which may be of any suitable type, but is here shown and presently is preferred to be of a porous stone type well known in the industry. The ozonator 356 is made of a diametrically extending tube of porous stone, the tube being designated by the reference numeral 358. The inlet for the tube 358 is designated by the reference numeral 360 and is in the form of a nipple extending from the inlet end of the porous stone tube 358 to a mounting flange 362. At the outer side of the mounting flange 362, there is a second nipple 364 that extends to a suitable connector, here in the form of a flange 366, that may be joined to a suitable ozone supply pipe 368 (see FIG. 16). The ozone generator is not shown and may be thoroughly conventional. For mechanical rigidity, the end of the pipe 358 remote from the inlet end may be provided with a mounting bar or pipe 370 that is secured to a suitable mounting flange 372 disposed diametrically opposite the mounting flange 362 that holds the ozone supply pipe hereinbefore described.

It will be recognized that this invention is not limited to the use of a single porous stone ozonator as hereinbefore described. If desired, a plurality of such porous stone ozonators may be employed, these being arranged in any desired array, or other forms of ozonators may be employed without departing from the present invention.

Beneath the ozonator 356 there is an apertured plate 374 that essentially isolates the section 320 of the tower 28 from the remainder thereof. This plate 374 is sandwiched between the flanges 376 and 378 at the bottom and top respectively of the section 318 and 320. It is held therein by suitable bolts (not shown). The plate 374 isprovided with a relatively small central aperture, of the order of about 4 inches in diameter, through which a small elbow, also of 4 inch diameter, extends, which elbow will permit liquid flowing downwardly through the upper portion of the ozonation-sonication tower to pass out through the bottom of the section 318 and into the section 320, the liquid being diverted away from the outlet 310 thereof to insure a substantial retention time of the liquid in the lowermost section 320 of the tower. Disposed at the bottom of the section 320 is a second ozonator 380 that may be, and preferably is, identical in all respects to the ozonator 356 and is mounted in a manner essentially the same. If desired, there may be a plurality of ozonators at this level. Disposed immediately beneath the ozonator 380 and forming the bottom of the ozonation-sonication tower 28 and the top of the pedestal 324 therefor is a diaphram 382 which diaphram is mechanically held by flanges 384 and 386 at the bottom and top respectively of the section 320 and the pedestal 324, these being secured to one another by suitable securing elements such as bolts (not shown). Disposed within the hollow pedestal 324 with their radiating surfaces in engagement with or mechanically coupled to the diaphram 382 are a multiplicity of relatively high frequency ultrasonic transducers, preferably, although not necessarily, of the piezoelectric type, which transducers are tuned to transmit an output vibration of the order of 85 kH or higher. The transducers 390 are disposed within the pedestal and out of contact with the flowing liquid which would be extremely deleterious to their action and the results achieved thereby. However, with the ozonator 380 disposed very close to the vibrating diaphram 382, it will be seen that the liquid flowing through the elbow 379 and then out through the outlet 382 will be subjected to simultaneous ozonation and high frequency sonication.

A number of desirable features are incorporated in the ozonation-sonication tower 28 hereinbefore described. The foremost of these is that the entire tower is based on the countercurrent flow principle whereby to greatly improve the effectiveness of the ozonation and sonication to which the liquid is subjected. That is to say, as the liquid moves from inlet to outlet it will constantly encounter higher and higher concentrations of ozone and ultrasonic radiation, especially of the lower frequency type, and this ever increasing density of ozone and sonic energy will have an ever increasing impact on the oxidation and sterilization of the liquid flowing through the tower. Secondly, it will be seen that the tower 28 employs two separate stages of ozonation and sonication, and the sonication is performed at different sonic frequencies. The reason for employing different sonic frequencies in the two sections is that it has been found that certain materials are more susceptible to one frequency than to another and that by employing different frequencies a wider range of materials may be treated effectively with sonic energy and further be rendered more susceptible to treatment by ozone.

For a 600,000 gallon per day plant as is being described, the inner diameter of the tower 28 is approximately 2 feet and the total height of the tower including the pedestal of about 10 inches is about 20 feet. The retention time of liquid in the tower is approximately 2 1/2 minutes. The amount of power consumed by the transducers 322 is approximately 4,000 watts, that is about 1,000 watts per transducer 322. The amount of power consumed by the transducers 390 is about 4,800 watts, that is about 200 watts per transducer, there being in the plant described an array of 24 such high frequency transducers in the pedestal 324. It is important that the transducers are operated at power levels to produce cavitation within the liquid passing through the tower for treatment.

The amount of ozone to be employed in the tower 28 is to a large extent dependent upon the nature of the influent to the tower and the state regulatory requirements for the effluent for the treatment plant. However, with an influent of ordinary domestic sewage treated as hereinbefore described in advance of introduction into the tower 28, it has been found that if ozone is introduced in sufficient quantity so that the total ozone introduced into the tank through the tubes 356 and 380 ranges between one and 10 parts per million of waste water treated, a desirable result will be achieved. Exceptionally good results have been obtained with pre-treated domestic waste water when about two parts per million of ozone are introduced into the chamber, preferably one part per million at each of the two ozone injection stations. Generally speaking, however, if such small quantities of ozone are introduced into the ozonation-sonication chamber 28, then an ozone contact chamber will probably be required as generally speaking it has been found that we require about six to 15 parts per million of ozonation throughout the system in order to achieve the required degree of oxidation and sterilization. However, if higher ozone concentrations are achieved in the ozonation-sonication chamber 28, then less or no ozone will be required in a contact chamber whereby to eliminate the need for such a contact chamber. In the alternative to the use of ozone contact chambers, additional ozonation-sonication towers 28 may be employed tandem with the chamber 28 hereinbefore described whereby to obtain the added advantage of the sonication prior to ozonation as has been described hereinbefore.

While we have herein shown and described the preferred form of this invention and have suggested modifications, other changes and modifications may be made therein within the scope of the appended claims without departing from the spirit and scope of this invention.

What is claimed is:

1. A method of treating waste water having entrained solids and dissolved contaminants therein, comprising the steps of:
   adding a coagulating agent to said waste water;
   adding a polyelectrolyte to said waste water to form a floc;
   then passing said waste water through a lamina to remove a substantial portion of any solids suspended therein;
   passing said waste water in a counter-flow through a large gravity gradient stand of water; and
   subjecting said waste water to the pre-treatment of ozone and sonic energy to cause cavitation therein, said waste water being subject to said cavitation at increasing energy levels while it encounters increasing concentrations of said ozone;
   forcing said waste water through a restriction into a hydraulic gradient of water and subjecting said waste water to highly confined and increasingly concentrated quantities of ozone in the presence of high ultransonic energy at increasing energy levels to effect cavitation within said waste water for effective sterilization and oxidation of said waste water.

2. A method for treating waste water according to claim 1 where there is a pre-treatment of the waste water with sonic energy and ozone prior to the waste water reaching a zone of maximum ozonation and sonication.

3. A method according to claim 2 where the sonic pre-treatment is at relatively low frequency just into the ultrasonic range.

4. A method according to claim 1 where the sonication imparts acoustic energy to the waste water so as not to reflect onto the source thereof.

5. A method according to claim 1 where the water is subjected to sonication at different frequencies.

6. A method according to claim 1 where the water is subjected to sonication at different frequencies and at different times.

* * * * *